US 11,815,053 B2

(12) United States Patent
Hearn, Jr. et al.

(10) Patent No.: US 11,815,053 B2
(45) Date of Patent: Nov. 14, 2023

(54) FUEL TREATMENT SYSTEM AND PROCESS

(71) Applicant: STC Developments B.V., Amsterdam (NL)

(72) Inventors: Ralph Eugene Hearn, Jr., Gzira (MT); Sten Rodenborg, Gzira (MT)

(73) Assignee: STC Developments B.V., Amsterdam (NL)

(*) Notice: Subject to any disclaimer, the term of this patent is extended or adjusted under 35 U.S.C. 154(b) by 0 days.

(21) Appl. No.: 17/794,173

(22) PCT Filed: Jan. 22, 2021

(86) PCT No.: PCT/IB2021/050487
§ 371 (c)(1),
(2) Date: Jul. 20, 2022

(87) PCT Pub. No.: WO2021/148995
PCT Pub. Date: Jul. 29, 2021

(65) Prior Publication Data
US 2023/0060441 A1 Mar. 2, 2023

(30) Foreign Application Priority Data
Jan. 22, 2020 (NL) .................................. 2024727

(51) Int. Cl.
F02M 26/36 (2016.01)
F02M 27/02 (2006.01)
(Continued)

(52) U.S. Cl.
CPC ............... *F02M 26/36* (2016.02); *F01N 5/02* (2013.01); *F02D 19/0671* (2013.01);
(Continued)

(58) Field of Classification Search
CPC ........ F02M 26/36; F02M 27/02; F02M 31/08; F02M 31/14; F02M 31/16; F01N 5/02; F02D 19/0671
See application file for complete search history.

(56) References Cited

U.S. PATENT DOCUMENTS 5,794,601 A * 8/1998 Pantone ................. F02M 31/18
123/538
7,207,323 B1 4/2007 Hemsath
(Continued)

FOREIGN PATENT DOCUMENTS

EP 2216537 A1 8/2010
JP 2008223537 A 9/2008
(Continued)

OTHER PUBLICATIONS

L.J. Pettersson and K. Sjostrom (1990); An Experimental and Theoretical Evaluation of the Onboard Decomposed Methanol Spark-Ignition Engine; Combust. Sci. and Tech. 71 (1990); pp. 129-143.
(Continued)

Primary Examiner — Jacob M Amick
(74) Attorney, Agent, or Firm — Andrus Intellectual Property Law, LLP

(57) ABSTRACT

The invention provides a fuel treatment system for cracking hydrocarbons in fuel for combustion engines. The system comprises a primary ducting component having an exhaust gas inlet zone, and a secondary ducting component which includes a fuel enrichment component and a processing chamber. The processing chamber may have an outlet zone connectable to the combustion engine. The inlet zone of the primary ducting component and the outlet zone of the processing chamber may be configured in a heat exchange relationship with each other and in a counter-current gas flow direction with respect to each other. During operation
(Continued)

of the system, heat from hottest volumes of the exhaust gas flowing in a furthest upstream portion of the ducting arrangement may be transferred to fuel-enriched exhaust gas flowing in a furthest downstream portion of the processing chamber. The system may include turbulence-inducing formations, including vortex-inducing formations configured in accordance with mathematical sequences such as the Fibonacci sequence.

20 Claims, 11 Drawing Sheets

(51) Int. Cl.
| | |
|---|---|
| F02M 31/08 | (2006.01) |
| F01N 5/02 | (2006.01) |
| F02D 19/06 | (2006.01) |
| F02M 31/14 | (2006.01) |
| F02M 31/16 | (2006.01) |

(52) U.S. Cl.
CPC ............ *F02M 27/02* (2013.01); *F02M 31/08* (2013.01); *F02M 31/14* (2013.01); *F02M 31/16* (2013.01)

(56) References Cited

U.S. PATENT DOCUMENTS

| | | |
|---|---|---|
| 2014/0216030 A1 | 8/2014 | Cockle et al. |
| 2014/0216400 A1 | 8/2014 | Hill et al. |
| 2014/0260203 A1 | 9/2014 | Lapointe et al. |

FOREIGN PATENT DOCUMENTS

| | | |
|---|---|---|
| WO | 199857057 A1 | 12/1998 |
| WO | 2006052054 A1 | 5/2006 |
| WO | 2019157581 A1 | 8/2019 |

OTHER PUBLICATIONS

Green Car Congress; Hydrogen-Enhanced Combustion Engine Could Improve Gasoline Fuel Economy by 20% to 30%; https://www.greencarcongress.com/2005/11/hydrogenenhance.html/; Concept Engines Fuel Efficiency, Fuels, Hydrogen (Nov. 5, 2005).

J. Cross, G. Jones, M.A. Kent; An Introduction to Pre-Reforming Catalysis; Nitrogen + Syngas 341 (2016); Abstract.

L. Devi, K.J. Ptasinski and F.J.J.G. Janssen; Decomposition of Naphthalene as a Biomass Tar Over Pretreated Olivine: Effect of Gas Composition, Kinetic Approach, and Reaction Scheme; Ind. Eng. Chem. Res. 44 (2005); pp. 9096-9104.

H. Alden, E. Bjorkman, M. Carlsson, L. Waldheim, in A.W. Bridgewater (Ed.); Advances in Thermochemical Biomass Conversion; Springer, Dordrecht (1993); pp. 216-232.

International Search Report and Written Opinion for International Patent Application No. PCT/IB2021/050487, dated Mar. 29, 2021.

\* cited by examiner

FUEL TREATMENT SYSTEM AND PROCESS

CROSS-REFERENCE TO RELATED APPLICATIONS

This application is the U.S. national stage application of International Application No. PCT/IB2021/050487, filed Jan. 22, 2021, which international application was published on Jul. 29, 2021, as International Publication No. WO/2021/148995 in the English language. The international application is incorporated herein by reference in its entirety. The international application claims priority to NL Patent Application No. 2024727, filed on Jan. 22, 2020, which is incorporated herein by reference in its entirety.

FIELD OF THE INVENTION

This invention relates to a system and process for treating fuel. In particular it relates to treatment of fuel for a heat engine such as, but not limited to, an internal combustion engine.

BACKGROUND TO THE INVENTION

Technologies exist for improving engine efficiency, improving fuel economy and reducing hazardous emissions. Frequently these focus on reducing friction or accurately controlling mixture and timing. Fuel treatment technologies have also been developed. For example, fuel enhancement with hydrogen has been reported. Hydrogen may be added to a conventional hydrocarbon fuel, for example. The hydrogen may be produced by electrolysis or by reforming conventional fuel into hydrogen with a catalyst.

Pettersson and Sjöström (1990) reported that the on-board dissociation of methanol, using exhaust heat to generate a hydrogen-rich gas, can promote part-load efficiency and help with cold starts [Ref. 1]. If high concentrations of hydrogen can be established then engines can be operated with leaner air/fuel mixtures, leading to lower emissions of nitrogen oxides.

Plasma reformers have also been developed that use hydrogen produced from fuel to enhance engine combustion efficiency and reduce emissions of $NO_x$ [Ref. 2]. The technology is relatively complex, however, requiring an on-board, compact plasma reformer as well as the application of high voltage to the air stream, and modifications to permit operation in the ultra-lean region of the plot of compression ratio versus air/fuel equivalence ratio (lambda).

The benefits of hydrogen enrichment are understood to result from the high flame speed of hydrogen in comparison to other fuels. Adding hydrogen gas to a homogeneous fuel charge improves its ignitability and increases flame speed and combustion stability. The presence of hydrogen is understood to permit leaner running by reducing the likelihood of misfiring. Lean operation can reduce carbon monoxide and hydrocarbon emissions and increase performance.

Methods of increasing the heating value of fuel (also known as gross calorific value or gross energy) and of recycling exhaust heat have also been investigated. Exhaust gas recirculation (EGR) has shown results in this field. By diluting the fresh charge of air and fuel mixture passing into an engine, the peak temperature can be reduced with a corresponding reduction in nitrogen oxide formation.

In the field of emissions control, conventional technologies typically involve post-combustion treatment of exhaust gases using expensive catalysts and exhaust heat to convert pollutants present in the gas to less environmentally harmful substances. The heat needed for such reactions does not typically contribute to the usable power output of the associated engine.

EP2216537A1 discloses and internal combustion engine. A fuel reforming catalyst is installed in an internal combustion engine, the catalyst generating a combustible gas from a reforming fuel by using the heat of the exhaust gas. In the reforming control, the combustible gas generated by the action of the catalyst is refluxed into the intake system. An ECU varies the lower limit temperature "To" of the reforming control depending on a mixture ratio of gasoline and ethanol in the reforming fuel. If the temperature "T" of the catalyst is lower than the lower limit temperature "To", the ECU 50 suspends the injection of the reforming fuel.

US2014260203A1 discloses an internal combustion engine system and method for reforming a portion of an exhaust gas stream in an internal combustion engine system. An exhaust gas recirculation assembly divides the exhaust gas stream into a recycle stream and a vent stream. A mixer in fluid receiving communication with the recycle stream forms a combination stream by mixing a gaseous fuel stream with the recycle stream. A thermochemical recuperator component fluidly connects to the mixer and includes a first flow path and a second flow path. The first flow path has a catalyst through which the combination stream flows to create a reformate stream, and the second flow path has a heat transfer area for transferring heat from the vent stream to the combination stream.

U.S. Pat. No. 5,794,601 discloses a fuel pretreater apparatus and method for pre-treating an alternate fuel to render it usable as the fuel source for fuel burning equipment such as internal combustion engines. The apparatus includes a volatilization chamber into which the alternate fuel is received. An exhaust plenum may enclose the volatilization chamber so that thermal energy supplied by exhaust from the fuel burning equipment can be used to help volatilize the alternate fuel. A bypass stream of exhaust may be diverted through the alternate fuel in the volatilization chamber to help in volatilizing the alternate fuel and help carry the volatilized fuel through a heated reactor prior to its being introduced into the fuel burning equipment. The reactor is preferably interposed in the exhaust conduit and is formed by a reactor tube having a reactor rod mounted coaxially therein.

WO2019157581A1 discloses an engine configuration and operating method associated with an internal combustion engine, which is connected to the intake line and exhaust gas line, having an EGR line for exhaust gas recirculation for the intake. The engine configuration has a reformer with a catalytic reformer and an evaporator, the catalytic reformer being mounted on the EGR line such that the reformed fuel is conveyed together with the recirculated exhaust gases to the intake of the internal combustion engine. The disclosed system provides a heat exchanger which heats the catalytic reformer using the exhaust gases.

US2014216030A1 discloses an exhaust system with a reformer catalyst, for treating exhaust gas from an internal combustion engine. The system comprises a three-way catalyst (TWC), a fuel reformer catalyst located downstream of the TWC, and a fuel supply means located upstream of the fuel reformer catalyst. The exhaust gas is split into two portions. The first portion of the exhaust gas bypasses the TWC and contacts the fuel reformer catalyst in the presence of fuel added from the fuel supply means. This portion is then recycled back to the engine intake. The second portion of the exhaust gas is contacted with the TWC and is then utilized to heat the fuel reformer catalyst before being expelled to atmosphere.

JP2008223537A discloses an exhaust gas reformer system for an internal combustion engine. The system is configured to provide a fuel reforming catalytic reaction when using fuel with a high latent heat of vaporisation. The system includes a heat exchange mechanism provided upstream of a fuel reforming catalyst in an EGR passage. Ethanol is injected proximate the heat exchange mechanism, upstream of the fuel reforming catalyst, and heat is transmitted to the ethanol through the heat exchange mechanism.

U.S. Pat. No. 7,207,323B1 discloses a fuel conversion system comprising a catalytic core reactor for thermochemical heat recovery. The system may include a reactor vessel comprising one or more reactor tubes. A monolithic fuel conversion catalyst structure may be substantially centred within each reactor tube. The reactor tubes may each be shaped to form a flow channel between the monolithic catalyst structure and an inside wall of the tube.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

According to a first aspect of the invention there is provided a fuel treatment system for cracking hydrocarbons contained within a fuel for a combustion engine having at least one target combustion chamber; said fuel treatment system comprising:
  a ducting arrangement which includes:
    a primary ducting component for ducting exhaust gas from an exhaust gas generation means and venting it to atmosphere, said primary ducting component including an exhaust gas inlet zone configured to receive the exhaust gas from the exhaust gas generation means, and an exhaust gas outlet vent;
    a secondary ducting component in fluid communication with the primary ducting component, and with the target combustion chamber of the combustion engine, said secondary ducting component comprising
      an exhaust gas offtake connected to the primary ducting component, for diverting a portion of the exhaust gas from the primary ducting component to serve as a carrier gas for the fuel;
      a fuel enrichment component connected to the exhaust gas offtake, for enriching the diverted carrier gas with fuel, thereby to provide a fuel-enriched carrier gas; and
      a processing chamber connected to the fuel enrichment component and having an inlet zone for receiving the fuel-enriched carrier gas from the fuel enrichment component, and an outlet zone connectable to the target combustion chamber; said processing chamber being configured to alter at least one characteristic of the fuel-enriched carrier gas selected from the group consisting of its chemical and physical characteristics;
wherein said exhaust gas inlet zone of the primary ducting component and said outlet zone of the processing chamber are configured in a heat exchange relationship with each other and in a substantially counter-current gas flow direction with respect to each other, such that heat from exhaust gas operatively flowing in a first direction in said exhaust gas inlet zone is operatively transferred to the fuel-enriched carrier gas flowing in the substantially counter-current direction in the outlet zone of the processing chamber, thereby to provide that heat from hottest volumes of the exhaust gas operatively flowing in a furthest upstream portion of the ducting arrangement is transferred to fuel-enriched carrier gas operatively flowing in a furthest downstream portion of the processing chamber.

The fuel treatment system may further include at least on turbulence-inducing device. The turbulence-inducing device may comprise at least one turbulence-inducing formation provided in the secondary ducting component, for inducing turbulence in the fuel-enriched carrier gas.

At least one of the turbulence-inducing formations may be selected from the group consisting of vortex-inducing formations; vortex-creating formations; Schauberger formations; swirl-inducing formations; flow obstruction formations; flow deflection formations; flow redirection formations; laminar flow disrupting formations; matrices; jagged outcroppings projecting from interior surfaces of the processing chamber; rods; elongate flat dividers defining straight channels; grids; rings; turbulators; labyrinthine formations; knurled formations; topological formations; surface treatments; and surface deposition formations.

The turbulence-inducing formation may comprise at least one spiral formation as vortex-inducing structure. Spacings between adjacent coils of the spiral formation may vary relatively to one another along a longitudinal axis of the spiral formation. The variable spacings between the adjacent coils of the spiral formation may be configured in accordance with the Fibonacci sequence, such that a ratio of the axial length of a longer first coil to the axial length of a second shorter coil adjacent to the longer first coil, may range from about 1.4 to about 1.8. The ratio may range from about 1.60 to about 1.64. The ratio may be about 1.618.

The primary ducting component may include a plenum that shares a common wall with the processing chamber. At least one spiral formation may spiral around said common wall, with spacings between successive coils of the spiral formation increasing progressively in a direction of flow of the exhaust gas operatively flowing in the plenum.

The fuel treatment system may include at least one elongate rod. The rod may be fixed in the processing chamber. At least one spiral formation may spiral around the rod, with spacings between successive coils of the spiral formation increasing progressively in the direction of flow of a fuel-enriched gas operatively flowing in the processing chamber.

The rod may be configured to be electrically charged.

The fuel treatment system may be configured so that the rod occupies no more than about 10% of the interior volume of the processing chamber.

The fuel enrichment component of the secondary ducting component may be configured in a heat exchange relationship with a portion of the primary ducting component. The fuel enrichment component and said portion of the primary ducting component may be arranged such that flow of the carrier gas through the fuel enrichment component and flow of the exhaust gas through said portion of the primary ducting component, respectively, are operatively substantially co-directional with respect to each other.

The fuel treatment system may include a fuel pretreater comprising a body defining a cavity for receiving fuel, the cavity being in fluid communication with a fuelling device of the fuel enrichment component; and a drivable vibrational element positioned and configured to vibrate the fuel flowing through the body cavity. The fuel may be in liquid form.

Without limitation thereto, the fuel enrichment component may include a fuel enrichment device selected from the group consisting of fuel injectors, carburettors, venturi-devices and the like.

The fuel enrichment component may be positioned remotely from the exhaust gas generation means, and proximate the inlet zone of the processing component, such that a flow path to be traversed by the fuel-enriched gas flowing from the fuel enrichment component to the processing chamber, is kept as short as is practically feasible thereby to limit heat loss from the fuel. Such a positioning may be referred to as "remote injection".

The fuel enrichment component may be configured to impinge pressurized fuel onto a heated surface of the primary ducting component at pressures in excess of 2 Bar and temperatures above 450° C.

Components of fuel treatment that are configured to carry the fuel-enriched carrier gas may be thermally insulated.

The processing component may, optionally, include a catalyst. It may include formations defining catalytic surfaces. The catalyst may be adapted for increasing the rate of a reaction selected from the group consisting of hydrocarbon cracking reactions and hydrocarbon reforming reactions.

The exhaust gas generation means may be the engine apparatus having the target combustion chamber, or it may be a different apparatus.

The fuel may be selected from the group consisting of petrol and diesel.

During operation of the described fuel treatment system, counter-current flow of the exhaust gas and the fuel-enriched carrier gas, particularly if segregated by a non-ferrous tube boundary, may establish magnetic field shear in the moving gases caused by ionic movement within the two gases flowing in opposite directions. Magnetoelectrodynamic field effects or plasma effects may play a role here. The tube boundary may separate the opposing direction of the flows while co-mingling field effects, creating the magnetic field shear in the fuel-enriched carrier gas. The magnetic field shear may contribute to cracking and breakdown of constituents of the fuel-enriched carrier gas, beyond simple heating breakdown.

According to a further aspect of the invention there is provided an engine apparatus which includes a fuel treatment system as described above, and at least one combustion engine having at least one target combustion chamber; wherein the processed fuel outlet zone of the secondary ducting component is connected to the target combustion chamber of the combustion engine.

The combustion engine in the apparatus may comprise an internal combustion engine.

The target combustion chamber may be configured to receive fuel only from the fuel treatment system. This configuration means that all the fuel that enters the combustion chambers of a converted engine may be fuel that has flowed through and been converted by the processing chamber of the fuel treatment system. Conventional fuel injectors that are typically provided as OEM equipment on engines may accordingly be omitted or removed from engines that are converted with the presently disclosed fuel treatment system.

According to a further aspect of the invention there is provided a method of retrofitting a fuel treatment system, as described above, to a combustion engine having at least one target combustion chamber, the method including connecting the ducting arrangement of the system to the combustion engine in fluid communication with the target combustion chamber.

The method may include removing all fuel supply to the target combustion chamber apart from a supply of fuel-enriched carrier gas from the fuel treatment system, so that all fuel operatively combusted by the combustion engine is converted fuel received into the target combustion chamber from the processing chamber of said fuel treatment system.

According to a further aspect of the invention there is provided a fuel treatment system for treating fuel for an engine apparatus which includes at least one heat engine defining at least one target combustion chamber, the fuel treatment system comprising:
  a ducting arrangement configured for ducting a carrier fluid into the target combustion chamber;
  a fuel enrichment component configured for enriching the carrier fluid with fuel upstream of the target combustion chamber;
  heating means for heating the fuel-enriched carrier fluid; and
  a processing component configured to alter at least one characteristic of the fuel-enriched carrier fluid, said characteristic being selected from the group consisting of its chemical and physical characteristics.

The fuel treatment system may include at least one turbulence-inducing device for inducing turbulence in the fuel-enriched carrier fluid. The turbulence-inducing device may be provided in the processing component.

The turbulence-inducing device may comprise at least one turbulence-inducing formation as described above.

The turbulence-inducing device may be configured to induce turbulence of a type selected from the group consisting of obstruction induced turbulence, vibration induced turbulence; shear inducing turbulence; and turbulence induced by spraying or injecting fluid into the carrier fluid. The turbulence-inducing device may include turbulence-inducing formations for generating turbulence within fuel-enriched carrier fluid passing operatively through the turbulence-inducing device. The turbulence-inducing formations may be positioned on inside surfaces of the device. The turbulence-inducing formations may be positioned on at least one supporting member provided within the processing component. The turbulence-inducing formations may be configured to deflect the flow path of carrier fluid flowing through the device.

The carrier fluid may comprise a gas. It may comprise an exhaust gas generated by an exhaust gas generation means. The exhaust gas generation means may be the engine apparatus having the target combustion chamber, or it may be a different apparatus.

The ducting arrangement may comprise a primary ducting component configured to be connectable to at least one heat engine downstream of an exhaust gas generating combustion chamber of said engine, and in fluid communication with said exhaust gas generating combustion chamber, for ducting exhaust gas to a region external the engine apparatus; and a secondary ducting component comprising the fuel enrichment component, the processing chamber, and exhaust gas offtake means connected to the primary ducting component, for diverting exhaust gas from the primary ducting component to the fuel enrichment component and the processing component.

The secondary ducting component may be configured for ducting exhaust gas enriched with fuel to the target combustion chamber or chambers via the processing chamber.

The fuel enrichment component may be arranged downstream of the offtake means. The processing chamber may be arranged downstream of the fuel enrichment component.

The processing chamber may be configured and positioned so that, in use, it may be operatively heated by exhaust gas flowing through the primary ducting means.

Either or both of the fuel enrichment component and the processing component may be associated with the primary ducting component in an operative heat-exchange relationship, such that either or both may during use be heated by the primary ducting component.

The processing component may, optionally, include a catalyst. It may include formations defining catalytic surfaces. The catalyst may be adapted for increasing the rate of a reaction selected from the group consisting of hydrocarbon cracking reactions and hydrocarbon reforming reactions.

The processing component may comprise at least one elongate member mounted to project into an internal cavity defined by the processing chamber. The elongate member may comprise a rod extending longitudinally along a portion of the length of the cavity, and generally coaxially with the processing chamber.

The heating means for heating the fuel-enriched carrier fluid may comprise at least one heat-exchange assembly. The heat-exchange assembly may be arranged to transfer heat from the primary ducting component to the secondary ducting component. The heat-exchange assembly may comprise a ducting arrangement comprising a portion of the primary ducting component enclosing at least a portion of the secondary ducting component. Instead or in addition, the heat-exchange assembly may comprise a portion of the secondary ducting component enclosing at least a portion of the primary ducting component.

The heat-exchange portions of the primary and secondary ducting components may be arranged generally coaxially with each other. They may be arranged such that flow of exhaust gas from the exhaust gas generating combustion chamber, and flow of fuel-enriched carrier gas to the target combustion chamber, may occur in an operatively countercurrent fashion.

The turbulence-inducing device may comprise features selected from the group consisting of flow-redirection formations, laminar flow disrupting formations, swirl-inducing formations, grids, matrices, rod-and-spiral arrangements, rings, turbulators, labyrinthine formations, elongate dividers defining straight channels, topological features, surface treatments, and surface deposition formations.

The, or each, matrix may comprise an extruded monolithic honeycomb-like arrangement.

At least some of the dividers may be radially-spaced and longitudinally aligned within the processing chamber. At least some of the dividers may define knife-edges.

The surface deposition formations may comprise jagged internal formations or outcroppings extending from interior surfaces of the processing chamber.

The system may comprise at least one material selected from the group consisting of ceramics, materials having low thermal expansion coefficients, and metal blends. The metal blends may be selected from the group consisting of alloys of Al—Ca, Al—Cu—Li, Cu—Ba, Cu—Sn—K, Cu—Ca—Li, Pt—Li—O, and blends of transition metals such as Pd. The elements of these blends may be provided as varying elemental isotopes. The blends may be sintered onto parts of the system. The blends may be embedded in parts of the system.

The processing component may comprise a substrate for carrying the catalyst. The catalyst substrate may be provided as part of the turbulence-inducing device. The catalyst may be provided on the substrate. The material described above may be provided as a constituent of either or both the turbulence-inducing device and the catalyst substrate.

The fuel enrichment system may include a fuel evaporator. The fuel evaporator may comprise an evaporation chamber and a heat transfer component for transferring heat to fuel operatively introduced into the evaporation chamber. The heat transfer component may comprise at least a portion of the primary ducting component.

The primary and secondary ducting components may be arranged such that, in use, operatively hotter exhaust gas (proximal the combustion chamber) is directed to flow by at least a portion of the processing chamber whilst operatively cooler exhaust gas (distal the combustion chamber) is directed to flow by the fuel evaporator.

The heat engine may comprise a combustion engine. The combustion engine may comprise an internal combustion engine (ICE). The combustion engine may comprise a gas turbine engine. Other types of heat engine, such as are listed elsewhere in this description, may be suitable.

The fuel may comprise a combustible fuel. The fuel may comprise a hydrocarbon fuel.

According to a further aspect of the invention there is provided an engine apparatus which includes at least one heat engine defining at least one target combustion chamber; and a fuel treatment system comprising:
  a ducting arrangement configured for ducting a carrier fluid into the target combustion chamber;
  a fuel enrichment component configured for enriching the carrier fluid with fuel upstream of the target combustion chamber;
  heating means for heating the fuel-enriched carrier fluid; and
  a processing component configured to alter at least one characteristic of the fuel-enriched carrier fluid, said characteristic being selected from the group consisting of its chemical and physical characteristics.

The processing component may include a catalyst. The catalyst may be adapted for increasing the rate of a reaction selected from the group consisting of hydrocarbon cracking reactions and hydrocarbon reforming reactions. The catalyst may comprise a catalyst such as that described above in relation to the fuel treatment system.

The processing component may comprise at least one turbulence-inducing device for inducing turbulence within the fuel-enriched carrier fluid.

The carrier fluid may comprise a gas. The carrier gas may comprise an exhaust gas generated by an exhaust gas generation means. The exhaust gas generation means may be the engine apparatus having the target combustion chamber, or it may be a different apparatus.

Further features of the engine apparatus and fuel treatment system may be as herein described.

The invention extends to a vehicle which includes either or both of a fuel treatment system and an engine apparatus as described herein.

The invention extends to a stationary installation which includes either or both of a fuel treatment system and engine apparatus as described herein.

The invention extends further to a fuel treatment system for an engine apparatus that includes an exhaust gas recirculation system, the fuel-treatment system comprising fuel enrichment means configured to introduce fuel into exhaust gas flowing operatively in the recirculation system.

Further features of the fuel treatment system may be as described herein in relation to the fuel treatment system.

According to a further aspect of the invention there is provided a process for treating fuel which comprises:
provided an engine apparatus which includes at least one heat engine defining at least one target combustion chamber;
enriching a carrier fluid with the fuel;
heating the fuel-enriched carrier fluid;
processing the fuel-enriched carrier fluid to alter at least one of its characteristics, said characteristics being selected from the group consisting of its chemical and physical characteristics; and
ducting the fuel-enriched carrier fluid into the target combustion chamber.

The process may include inducing turbulence in the carrier fluid. This step may include providing a turbulence-inducing device and passing the carrier fluid through or over it. The turbulence-inducing device may comprise a vortex-inducing device as herein described. It may, for example, comprise at least one spiral formation as vortex-inducing structure. Spacings between adjacent coils of the spiral formation may vary relatively to one another along a longitudinal axis of the spiral formation. The variable spacings between the adjacent coils of the spiral formation may be configured in accordance with the Fibonacci sequence, such that a ratio of the axial length of a longer first coil to the axial length of a second shorter coil adjacent to the longer first coil, may range from about 1.4 to about 1.8. The ratio may range from about 1.60 to about 1.64. The ratio may be about 1.618.

The process may accordingly include a step of generating at least one vortex in the offtake- or fuel-enriched volumes of the exhaust gas. This step may include passing the gas over a spiral formation such as that described above. The spiral formation may be configured in accordance with the Fibonacci sequence.

Enriching the carrier fluid with the fuel may include providing a fuel enrichment component configured for enriching the carrier fluid with the fuel upstream of the target combustion chamber, and passing the carrier fluid through the fuel enrichment component.

Processing the fuel-enriched carrier fluid may include providing a processing component configured to alter at least one characteristic of the fuel-enriched carrier fluid, said characteristic being selected from the group consisting of its chemical and physical characteristics; and passing the fuel-enriched carrier fluid through the processing component.

The carrier fluid may comprise a gas. The carrier fluid may comprise exhaust gas generated by the engine apparatus.

Heating the fuel-enriched carrier fluid may include transferring heat to it from exhaust gas drawn from the engine apparatus.

Details of the fuel enrichment component, processing component, turbulence-inducing device, engine apparatus, fuel and other features may be as described herein in relation to the fuel treatment system.

The process may include ducting the fuel-enriched carrier fluid over a catalyst. The catalyst may be adapted for increasing the rate of a reaction selected from the group consisting of hydrocarbon cracking reactions and hydrocarbon reforming reactions. The catalyst may comprise a catalyst such as that described above for the fuel treatment system.

The invention extends to a process for increasing the hydrogen content of a fuel which includes a step of treating the fuel using the described fuel treatment process.

The invention extends further to a fuel produced by treating it with the described fuel treatment system, and to a fuel produced by treating it using the described process for treating fuel.

Embodiments of the invention will now be described, by way of example only, with reference to the accompanying drawings in which like reference numerals have been used to designate similar parts or features correspondingly throughout, unless otherwise stated.

DETAILED DESCRIPTION WITH REFERENCE TO THE DRAWINGS

Figure 1:
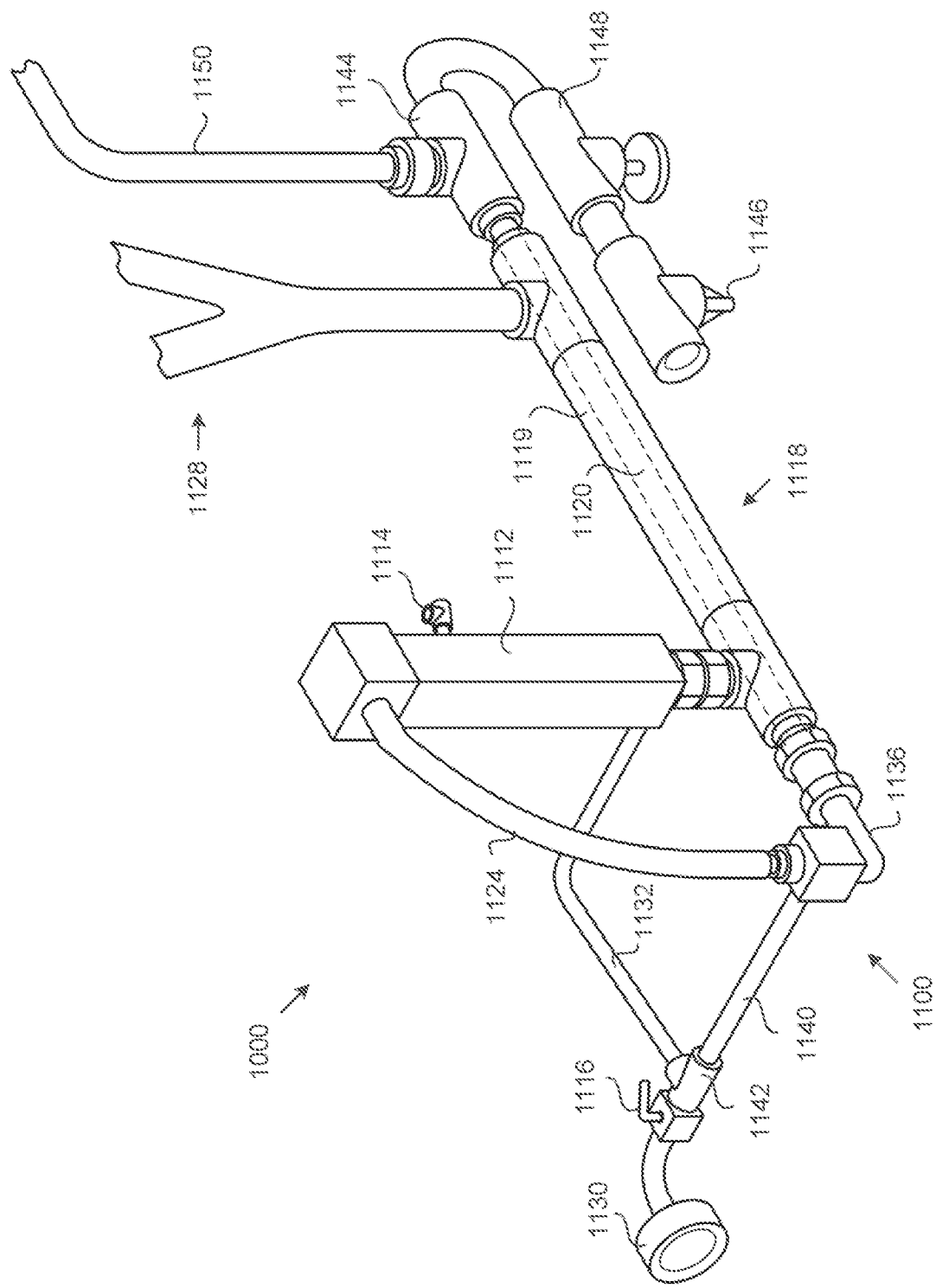
FIG. 1 is a schematic three-dimensional view of the described fuel treatment system (converter)

Referring to the drawings, a fuel treatment system (1000) is shown which may be integrated with an engine apparatus (not shown). The system may be configured to introduce fuel into a carrier gas and to process the fuel-gas mixture before introducing it into an engine. The carrier fluid may, for example, comprise an exhaust gas generated by the engine or a different engine.

Treatment of the fuel using the system may be effective to modify the properties of the fuel in such way that more efficient combustion of the fuel in the engine is achieved. The treatment may be carried out with the aid of excess thermal energy from combustion.

In the descriptions which follow, the fuel treatment system may be described as a converter. An engine fitted with a converter may be described as a converted engine. Reference is made to internal combustion engines, but it will be appreciated that embodiments of the presently disclosed converter may be fitted to other types of heat engines. Also, a converter may be fitted to an engine apparatus comprising a plurality of engines.

As shown in the drawings, the embodiment (1000) of the converter may comprise a ducting arrangement (1100) configured for ducting a carrier gas such as exhaust gas from a combustion chamber (not shown) of the engine and venting a portion of it to atmosphere whilst recirculating an offtake portion of the gas back to the same engine or a different engine.

The converter may comprise a fuel enrichment component (1112) ("tower") for enriching the offtake gas with the fuel. This component may comprise at least one fuelling device (1114) for adding fuel to the carrier gas. A plurality of such fuelling devices may be provided. Without limitation thereto, the fuelling device or devices may be selected from the group consisting of fuel injectors, carburettors, venturi systems, jets and combinations of these.

A shunt valve (1116) may be provided to control the proportion of offtake gas that is diverted from the main flow of the exhaust gas and recirculated back to the engine. During normal operation, only a small portion of the exhaust gas is required both to heat and to mix as a carrier gas into the fuel stream.

The converter may further include a processing component (1118). As shown, the processing component may be arranged downstream of the fuel enrichment component (1112). It may be configured to receive offtake exhaust gas after it has been enriched with fuel during its passage through the fuel enrichment component.

The processing component (1118) may include a primary heat jacket or plenum (1119), also referred to herein as an outer tube. The plenum may be configured to receive and duct raw exhaust gas as the gas leaves the exhaust manifold of an engine and enters the converter, as indicated by the arrows (aa) shown in FIG. 2. It will be appreciated that the raw exhaust gas is at its hottest during this phase of its flow, being closer to the combustion chambers where it was generated than it is in subsequent parts of the converter.

The processing component (1118) may further include a processing chamber or vessel (1120), also referred to herein as an inner tube. The processing chamber may be arranged inside the plenum. This configuration may permit heat from the hottest raw exhaust gases to be transferred to the fuel-enriched gas flowing in the inner tube. Indeed, since the gas in the inner tube flows in an opposite direction to that flowing in the outer tube, the operatively hottest portion of the raw exhaust gas flows over the inner tube at a location just before where the fuel-enriched gas leaves the processing chamber and the converter and enters the engine. This configuration means that the fuel-enriched gas near the terminal end of the processing component has heat transferred to it by the hottest gases flowing through the converter.

The processing chamber or inner tube (1120) may include a first end, a second end, and a housing surrounding a chamber that defines a main channel. The main channel may have a longitudinal axis.

The processing chamber (1120) may include at least one wall which may have a cylindrical or tubular configuration.

The processing component (1118) may comprise one or more turbulence-inducing devices. These may be configured for inducing turbulence in the fuel-enriched carrier gas before it flows into the engine. The turbulence-inducing devices are discussed in more detail below.

The turbulence-inducing devices may be positioned inside the processing chamber (1120) or on or around walls of the processing chamber (1120), or elsewhere in the system (such as in the tower).

Figure 6:
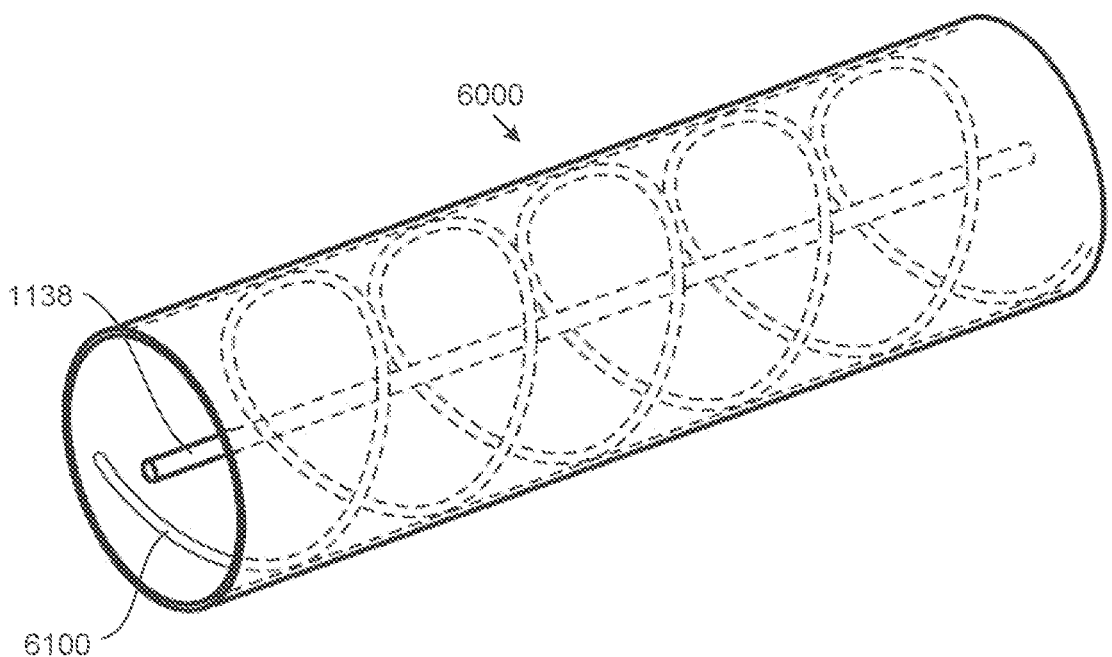
FIG. 6 is a schematic three-dimensional view of a portion of a third embodiment of a processing chamber comprising a rod with a spiral formation coiled around it.
Figure 7:
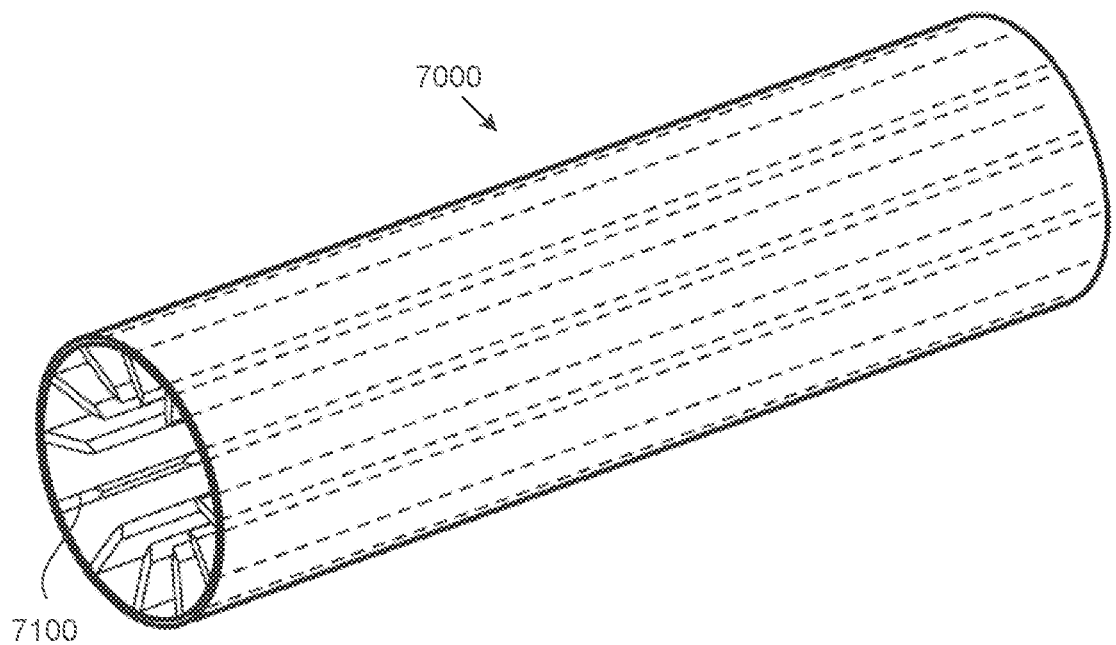
FIG. 7 is a schematic three-dimensional view of a portion of a fourth embodiment of a processing chamber comprising internal dividers defining knife edges.
Figure 8:
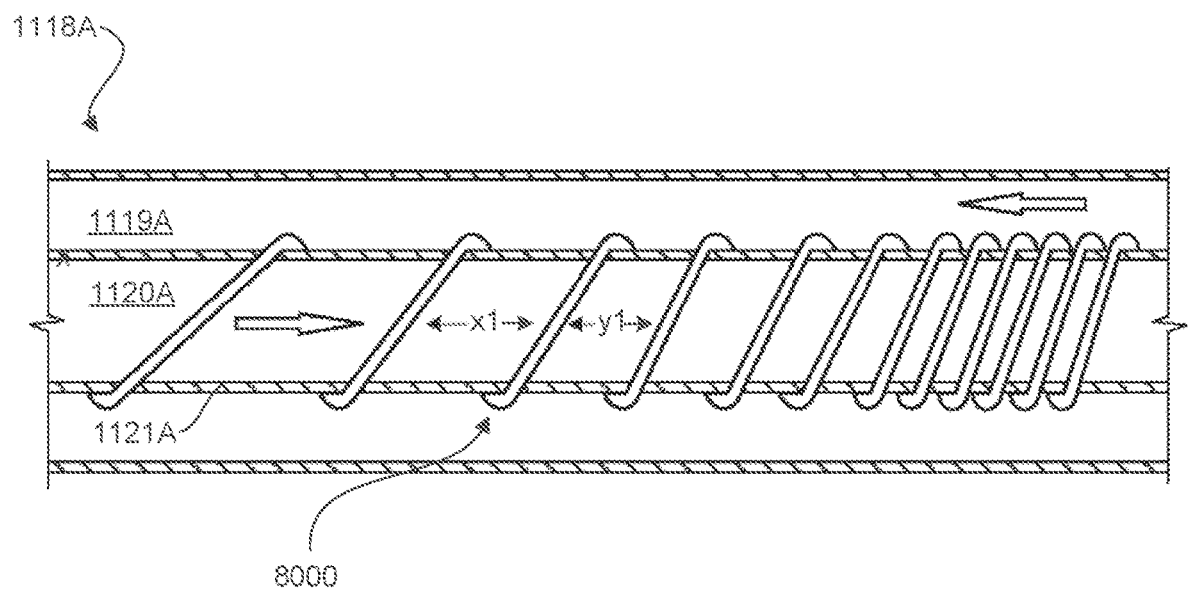
FIG. 8 is a schematic cross-sectional view showing a processing component which includes an exhaust gas plenum arranged to enclose an inner, coaxially arranged processing chamber, wherein a spiral Fibonacci rib coils around the outside of the inner processing chamber.
Figure 9:
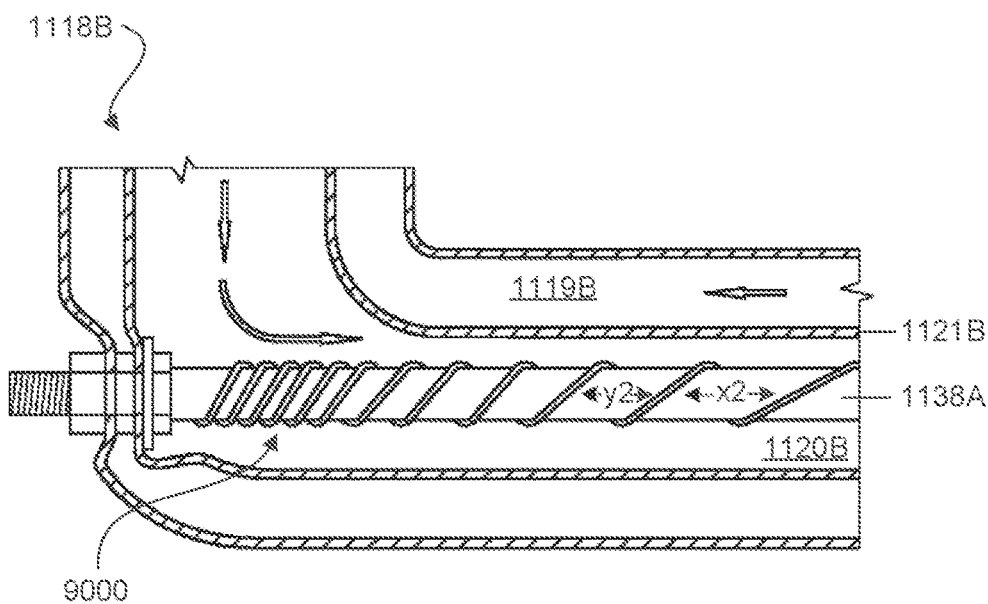
FIG. 9 is a schematic cross-sectional view of different embodiment of a processing component, in which a fixed, electrically-driven rod extends along the inside of the inner processing chamber and a spiral Fibonacci rib coils around the outside of the fixed rod.

The turbulence-inducing devices may include at least one vortex-inducing or vortex-creating device. Such devices may comprise at least one spiral formation. Examples of such spiral formations are shown in FIGS. 6, 8 and 9 and are discussed further below.

The processing chamber (1120) may comprise a cracking chamber, which may be configured to crack hydrocarbon compounds. In such embodiments, the catalyst may comprise a catalyst for a hydrocarbon cracking reaction.

The processing chamber (1120) may, instead or in addition, comprise a reforming chamber configured to reform hydrocarbon compounds.

The processing chamber (1120) may, instead or in addition, comprise a hydrogen enrichment chamber. The processing chamber may thus be configured to enrich a hydrogen content of the fuel.

The converter (1000) may include heating means for heating the carrier gas both before and after it is enriched with fuel. The heating means may be configured to employ upstream volumes of the carrier gas flowing in the ducting arrangement as a means for heating downstream volumes of the gas. Thus, in use, heat from the main flow of hot exhaust gas can be transferred to downstream offtake gas diverted from the main flow.

The heating means may include heat exchange means arranged to exchange heat between the primary and secondary ducting components. The heat exchange means may comprise a ducting arrangement wherein a portion of the primary ducting component encloses at least a portion of the secondary ducting component. Instead or in addition, the heat exchange means may comprise a ducting arrangement wherein at least a portion of the secondary ducting component encloses at least a portion of the primary ducting component.

The heat exchange portions of the primary and secondary ducting components may be arranged generally coaxially with each other.

The heat exchange means may be integrated with the processing chamber (1120). The heat exchange means may be configured operatively to heat the processing chamber using exhaust gas flowing through the primary ducting means.

The primary and secondary ducting components may be arranged such that, in use, operatively hotter exhaust gas (proximal the combustion chamber) is directed to flow past at least a portion of the processing chamber whilst operatively cooler exhaust gas (distal the combustion chamber) is directed to flow past the fuel enrichment component (1112).

Figure 2:
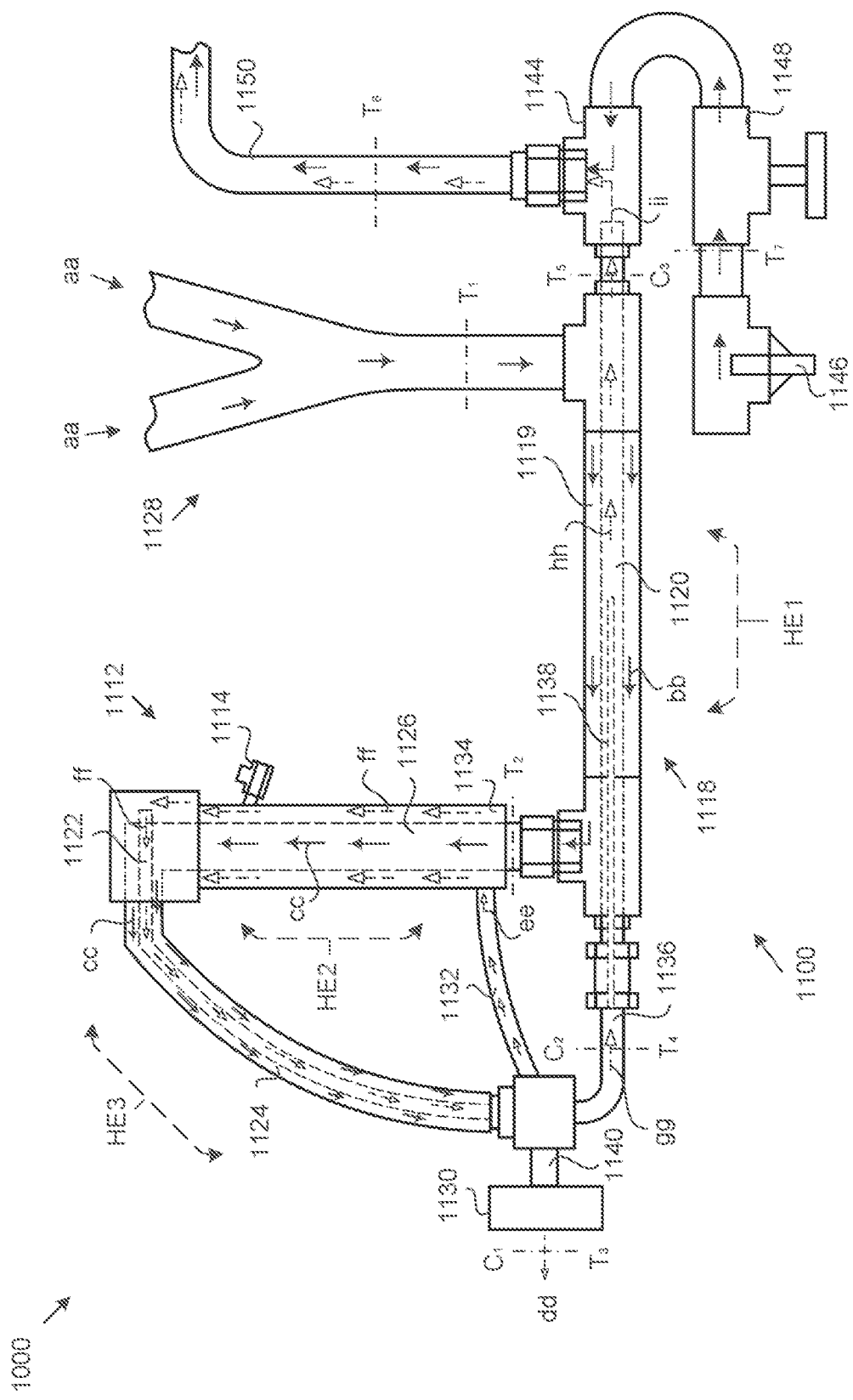
FIG. 2 is a schematic left side view of the fuel treatment system shown in FIG. 1.
Figure 3:
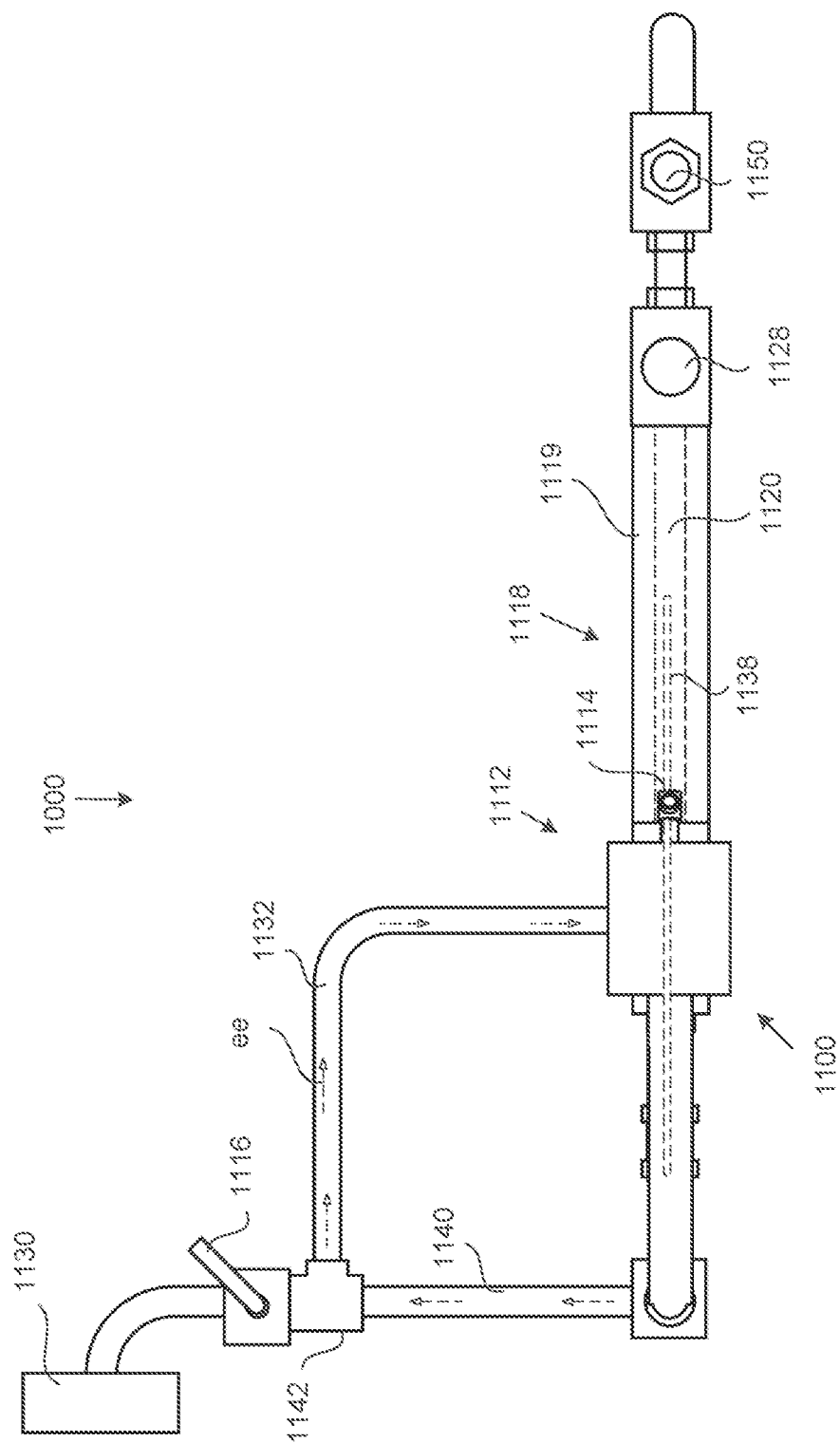
FIG. 3 is a schematic top view of the fuel treatment system shown in FIGS. 1 and 2.
Figure 4:
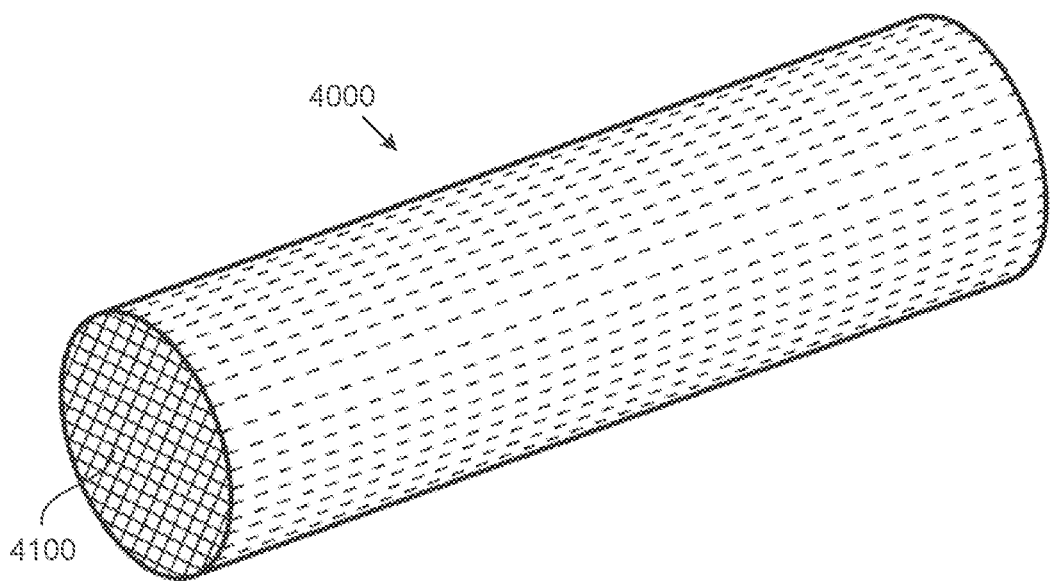
FIG. 4 is a schematic three-dimensional view of a portion of a first embodiment of a processing chamber comprising a longitudinal matrix.
Figure 5:
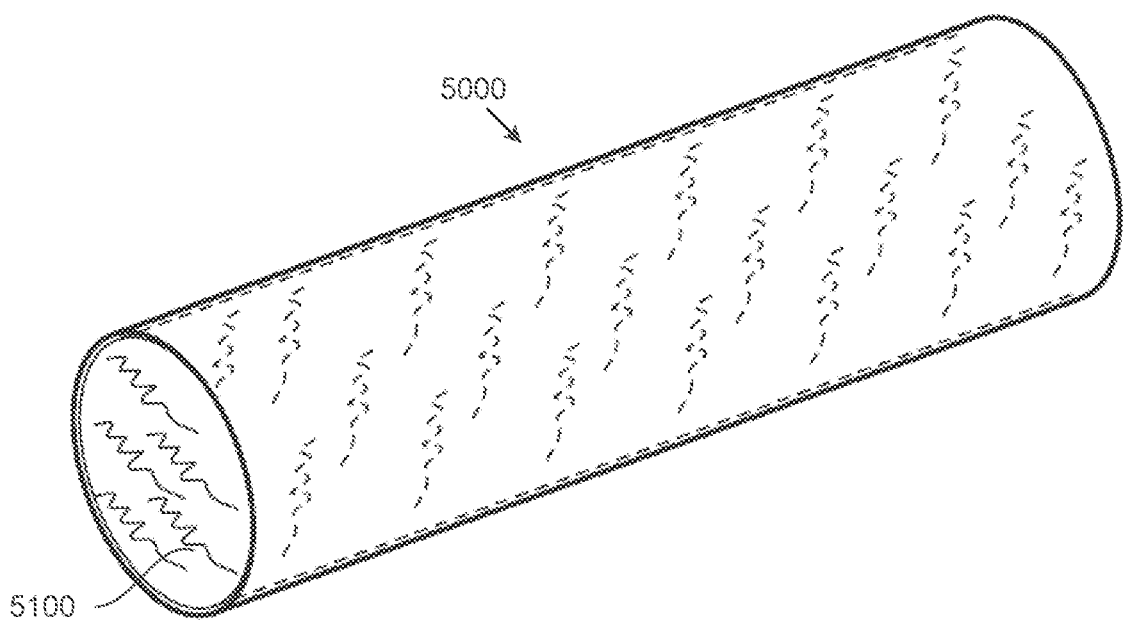
FIG. 5 is a schematic three-dimensional view of a portion of a second embodiment of a processing chamber comprising jagged internal formations.

In the embodiment of the converter (1000) shown in FIGS. 1 to 3, the heat exchange means may be provided by cooperating pairs of heating sections and heated sections which interface and cooperate with each other to provide heat-exchange zones. Examples of such zones are shown in FIG. 2 and labelled HE1, HE2 and HE3. The heating sections of each zone are typically provided operatively upstream of their associated heated sections. During operation of the converter, the heating section of each heat-exchange zone may conduct carrier fluid (e.g. exhaust gas) which is hotter than the carrier fluid flowing in its associated heated section. During operation, heat may accordingly flow from the heating sections to the heated sections.

Sections of the ducting arrangement may be arranged in reflexive orientations with respect to one another so that upstream and downstream sections run proximate to, or in contact with, each other for the purpose of promoting heat transfer from hotter to colder volumes of the exhaust gas. The reflexive sections may be positioned or positionable to run inside or outside each other, or alongside each other, or adjacent each other.

In all three of the heat-exchange zones shown in the drawings (HE1; HE2; HE3) an inner tubular conduit is shown surrounded by an outer tubular jacket. In each case the conduit and jacket are shown substantially coaxially aligned with each other, the conduit being enclosed by the jacket in each case.

The heating sections and heated sections of the ducting arrangement may be arranged such that, in operation, they provide an operatively counter-current flow of the exhaust gas so that heat-transfer efficiency may be promoted. Thus, in the zone HE1, which includes the processing chamber (1120), the heating section and heated section are configured to permit counter-current flow of the exhaust gas. During operation, hot exhaust gas flowing from the engine may accordingly pass in a counter-current direction over and around the processing chamber, heating the cooler offtake gas that is entering the processing chamber.

The zones (HE2; HE3) of the ducting arrangement are configured to permit gas flow in a co-directional fashion. As shown in FIG. 2, one of these zones (HE2) may include the fuel enrichment component or tower (1112). Also as shown in FIG. 2, the other zone (HE3) may include an enriched-gas conduit (1122) surrounded by an external exhaust jacket or dump link tube (1124). During operation, this zone (HE3) may become the second hottest region in the converter.

Variations and modifications to the configuration and relative dimensions of the inner and outer parts of the heat-exchange zones may be tested and refined by routine experimentation, with the goal of promoting and improving heat transfer efficiencies. For example, it may be feasible to provide an inner tube having a substantially longer length than its surrounding jacket by providing the inner tube in a compact configuration. Such a configuration may, for example, provide one or more spiral, coiled, labyrinthine or serpentine inner tubes or fins to increase heated surface area and promote heat transfer between gases flowing in the heating sections and heated sections respectively.

It will be appreciated that the number of heat-exchange zones may differ in different embodiments of the described system. Thus, although FIG. 2 shows three heat-exchange zones (HE1; HE2; HE3) other embodiments may include fewer or more than three zones.

In the examples discussed here, exhaust gas generated by the engine serves as the heating means. However, it will be appreciated that heating means other than exhaust gas may be employed. Thus, the heating means may comprise other suitable fluids such as steam or other gases. Instead or in addition, and without limitation thereto, the heating means may include any suitable electrical heating apparatus, chemical heating apparatus, nuclear heating apparatus and/or other heating apparatus based on heat radiation, conduction, and/or convection.

The ducting arrangement (1100) may comprise a primary ducting component extending from an exhaust manifold (1128) to an exhaust port open to atmosphere. The exhaust port may be associated with a muffler or silencer (1130). During operation of the engine and the converter, exhaust gas from the engine may flow sequentially through successive sections of the primary ducting component, starting from the exhaust manifold (1128) and passing through the various sections until the bulk of the gas is dumped to atmosphere through the muffler (1130).

The ducting arrangement may further include a secondary ducting component for ducting offtake gas diverted from the main volume of exhaust gas, to the target combustion chamber or chambers.

The secondary ducting component may start with an offtake component configured to permit a portion of the exhaust gas to be diverted from the main gas flow. The offtake component may include an offtake tube (1132) connected to the primary ducting component at an upstream end of the offtake tube.

The offtake component is typically in fluid communication with the fuel enrichment component (1112), the processing chamber (1120) and the target combustion chamber or chambers of the engine apparatus. The secondary ducting component may be configured so that it is able, in use, to duct fuel-enriched carrier gas via the offtake component, the fuel enrichment component and the processing component to the engine apparatus.

The system may be configured so that, in use, fuel-enriched carrier gas will be supplied to the same combustion chamber from which the gas was exhausted. Thus, the combustion chamber to which the primary ducting component is connected may be the same combustion chamber to which the secondary ducting component is connected.

Instead or in addition, the system may be configured so that, in use, fuel-enriched carrier gas may be supplied to a different combustion chamber than the chamber from which the gas was exhausted. The target combustion chamber may comprise a different combustion chamber of the same engine from which the gas was exhausted. Instead or in addition, the target combustion chamber may comprise a combustion chamber of a separate engine. Thus, exhaust gas may be ducted between separate, distributed engines within the engine apparatus. Also, it will be appreciated that there may be multiple target combustion chambers to which the fuel-enriched gas may be sent.

The fuel enrichment component or tower (1112) may include a fuel evaporator for evaporating fuel that is sprayed or otherwise delivered into the carrier gas by the fuelling device (1114), i.e. by the injector or injectors. As shown in FIG. 2, the evaporator may include an evaporation or vaporisation chamber (1134) ("tower chamber"). The evaporation chamber may comprise an elongate tubular formation surrounding the central tower tube (1126) of the primary ducting component. The latter tubular formation may be referred to as the outer tube of the tower.

Hot exhaust gases from the engine flowing up the central tower tube (1126) may heat the outside surface of the central tower tube (1126), providing a heated surface onto which the fuel may be sprayed with the injectors and evaporated. The outside surface of the central tower tube may also transfer some of its heat to the offtake portion of the exhaust gas as that gas flows up the tower and gets enriched with fuel.

The fuel enrichment component may be configured for metering fuel into the evaporation chamber. During operation, metered fuel may be sprayed or otherwise deposited into the offtake gas and onto the heated surface, which, being hotter than the gas in the evaporation chamber, may promote evaporation of the fuel carried by the offtake gas.

The enriched-gas conduit (1122) is positioned downstream of the fuel enrichment component and arranged so that fuel-enriched gas can flow along it to the processing component. The conduit may be mounted inside the exhaust jacket (1124) so that the enriched gas in the conduit can be heated by hotter upstream exhaust gas flowing in the exhaust jacket.

As best seen in FIG. 2, the enriched-gas conduit may run generally coaxially down the exhaust jacket and then pass through a capped or plugged bottom end of the exhaust jacket. From there the conduit may connect to the downstream processing chamber (1120) via a connector pipe or fitting (1136).

As mentioned, the processing component (1118) may include one or more turbulence-inducing devices. FIGS. 4 to 7 show four exemplary embodiments of suitable turbulence-inducing devices (4000; 5000; 6000; 7000). It will be appreciated that a wide variety of other configurations of turbulence-inducing devices are feasible.

The turbulence-inducing device or devices may be configured to induce turbulence in the gas by modes selected from the group consisting of obstruction, deflection, vibration, swirl, shear, ultrasonic excitation, and fluid injection (e.g. liquid spray injection).

The device or devices may include turbulence-inducing formations for generating turbulence within fuel-enriched carrier gas passing operatively through the device. Such formations may be positioned on inside surfaces of the processing chamber. They may be positioned on one or more support members. The turbulence-inducing formations may be configured to deflect the path of the fuel-enriched carrier fluid flowing through the turbulence-inducing device.

Without limitation thereto, the turbulence-inducing formations may be selected from the group consisting of flow obstruction formations; flow deflection formations; flow redirection formations; vortex-inducing structures; vortex-creating structures; Schauberger formations; laminar flow disrupting formations; swirl-inducing formations; longitudinal matrices (4100); jagged outcroppings (5100) projecting from interior surfaces of the processing chamber; internal rod (1138) and spiral (6100) arrangements; elongate flat dividers (7100) defining straight channels; grids; rings; turbulators; labyrinthine formations; knurled formations; topological formations; surface treatments; and surface deposition formations.

The turbulence-inducing formations may be positioned and configured to direct flow of different volumes of the fuel-enriched carrier gas in conflicting directions relative to one another (e.g. in generally opposite directions to one another), thereby to establish relative ionic movement and magnetic field shear in the different volumes of the gas via magnetoelectrodynamic field effects or plasma effects. It is surmised that the magnetic field shear may contribute to cracking and breakdown of the constituents in the fuel enriched carrier gas.

The vortex-inducing structure may comprise at least one spiral formation. The spiral formation may be provided on either an inside or an outside surface of the processing chamber, or on both the inside and outside surfaces. It may be provided inside the processing chamber. It may be provided mounted on, or supported by, structures within the processing chamber.

The spacing between adjacent coils of the spiral formation may vary along a longitudinal axis of the spiral formation. In two alternative embodiments, for example, the adjacent coils may become progressively closer or further away from each other along the longitudinal axis of the main channel of the processing chamber (1120), i.e. the spacing between successive coils may progressively decrease or increase respectively.

The configuration and curvature of the path followed by the spiral formation may follow a mathematical sequence. It may follow a logarithmic sequence. The changing spacing of the spiral coils may be configured in accordance with the Fibonacci sequence. In other words, the ratio of the axial length of a given coil of the spiral to the axial length of an adjacent coil may approximate the so-called Golden Ratio or Golden Mean. The ratio of the axial length (x) of a larger adjacent coil to the axial length (y) of a smaller adjacent coil, may approximately match the Golden Ratio (1.618). The ratio of (x) to (y) may be in a range from about 1.4 to about 1.8, and preferably from about 1.60 to about 1.64. In an exemplary embodiment, the ratio may be about 1.618.

Spiral formations having this configuration may be referred to as Fibonacci ribs.

Each spiral formation may stand out in raised relief from the wall of the processing chamber, rod or other feature upon which it is provided. It may accordingly be an embossed feature. It may be cast, forged or moulded integrally with the wall, or affixed to it. In other embodiments the spiral formation may be recessed into the wall (debossed).

FIG. 8 shows a cross-section through an embodiment of a processing component (1118A), which is provided with a vortex-inducing structure (8000) in the form of a Fibonacci rib spiralling around the outside of a cylindrical wall (1121A) of the processing chamber (1120A).

It will be appreciated that the outside surface of the cylindrical wall (1121A) is also the surface of the inner wall of the plenum (1119A).

The spacing between adjacent coils of the spiral rib structure varies along the longitudinal axis of the processing chamber. In the embodiment shown in the drawings, the spacing between successive coils increases progressively in the direction of flow of the raw exhaust gas flowing in the outer tube or plenum (1119A), i.e. the coils of the rib are spaced progressively further apart from one another from right to left in FIG. 8. In a less preferred embodiment (not shown), the spacing between successive coils of the Fibonacci rib may decrease progressively in the direction of raw exhaust gas flow in the plenum.

The configuration and curvature of the pathway followed by the spiral formation may follow a mathematical sequence. It may have a logarithmic spiral configuration. The changing spacing of the coils of the spiral rib around the processing chamber (1120A) may be configured in accordance with the Fibonacci sequence. Thus, the ratio of the axial length of a given coil of the spiral rib to the axial length of an adjacent coil may approximate the so-called Golden Ratio or Golden Mean. The ratio of the axial length (x1) of a larger adjacent coil to the axial length (y1) of a smaller adjacent coil, may approximately match the Golden Ratio (1.618). The ratio of (x1) to (y1) may be in a range from about 1.4 to about 1.8, and preferably from about 1.60 to about 1.64.

In an exemplary embodiment, the ratio may be about 1.618.

In embodiments of turbulence-inducing devices which include a matrix, the matrix may comprise an extruded monolithic honeycomb-like arrangement. Where dividers are present, at least some of them may be radially-aligned within the processing chamber, angularly spaced from one another.

Certain features of the internal structure of the inner tube may define knife edges. For example, the dividers or the internal spiral, if present, may define knife edges.

The system may include at least one catalyst (not shown). The catalyst may be adapted for increasing the rate of a hydrocarbon cracking reaction. The catalyst may be provided in at least a portion of the secondary ducting component. The catalyst may be provided in the processing chamber.

The processing chamber may include formations defining catalytic surfaces (not shown). The processing chamber may comprise a substrate for carrying the catalyst.

As shown in FIGS. 2, 3 and 9, the processing component may include at least one elongate rod or tube (1138). The rod or tube may be mounted on the inside of the connector pipe (1136) and may project into the internal cavity of the processing chamber or inner tube (1120; 1120B). It may be aligned generally coaxially with a primary longitudinal axis of the processing chamber.

The rod (1138; 1138A) may advantageously be fixed rather than floating or rotatable.

The rod or the inner tube may carry or support turbulence-inducing formations. Referring to FIG. 9, the rod (1138A) may carry a turbulence-inducing device in the form of a vortex-inducing, spiral rib (9000) spiralling around the outside of the rod. The rib may be configured based on the Fibonacci sequence, that is, it may comprise a Fibonacci rib.

The spacing between adjacent coils of the Fibonacci rib around the rod varies along a longitudinal axis of the rib, i.e. along the principal longitudinal axis of the rod. The spacing increases progressively in the direction of the gas flow over the rod in the processing chamber, i.e. the coils around the rod are spaced progressively further apart from one another from left to right in FIG. 9. In a less preferred embodiment (not shown), the spacing between successive coils of the Fibonacci rib around the rod may decrease progressively in the direction of gas flow in the processing chamber.

The changing spacing of the coils of the spiral rib around the rod may be configured in accordance with the Fibonacci sequence. Thus, the ratio of the axial length of a given coil of the spiral rib to the axial length of an adjacent coil may approximate the so-called Golden Ratio or Golden Mean. The ratio of the axial length (x2) of a larger adjacent coil to the axial length (y2) of a smaller adjacent coil, may approximately match the Golden Ratio (1.618). The ratio of (x2 to y2) may be in a range from about 1.4 to about 1.8, and preferably from about 1.60 to about 1.64. In an exemplary embodiment, the ratio may be about 1.618.

The fixed rod (1138; 1138A) may be electrically charged and pulsed. In one embodiment of the converter, the fixed rod may be electrically charged with a high voltage, predetermined waveform and sequence of electrical pulses to create an electrical field. It may be driven by a narrow (100 nanosecond or shorter dwell), high voltage (500 V or more), pulse-train signal with millisecond off-time.

Some embodiments of the converter may be equipped with an apparatus intended to generate a drive signal comprising so-called "white electricity", also referred to in the work of Nikola Tesla as "radiant energy". In the presently disclosed converter such an apparatus may be intended to effect changes to the fuel-enriched gaseous mix, rather than being applied for the transmission of energy over distances as posited in the work referred to above. Without committing to the veracity of the following statements, it has been posited that white energy may be derivable from inductive decay, or back electromotive force (emf), of an electromagnetic element, e.g. an element having up to 1 000 turns of fine magnet wire with, for example, a diameter of about 20 mm and a length of about 120 mm. Pulse position may be randomized. No commitment is made to the likely functionality or effectiveness of such an apparatus.

The disclosed converter may also include a fuel pretreater for treating the liquid fuel before it enters the fuel enrichment component, i.e. before it enters the tower (1112) and flows as a gas to the processing chamber (1120). Three different embodiments of a pretreater (10000; 11000; 12000) are shown in FIGS. 10 to 13.

During operation of the converter, the first stage of processing of the fuel may take place in the pretreater.

The pretreater may comprise a vibrational element or horn formation (10010; 11010; 12010) with an elongate stem (10020; 11020; 12020). The pretreater may further comprise a base or body (10030; 11030; 12030) that defines a well or cavity (0040; 11040; 12040) for receiving the vibrational element and for receiving liquid fuel en route to the fuel enrichment component. The body and the well may be fashioned from a block of steel or suitable plastics material.

The vibrational element may be driven by a drive means (12050 in FIG. 12) configured to vibrate the element at a frequency of 20 kHz or higher to create micro vortexes in the liquid fuel. Vibration or oscillation may take place in an axial (vertical or longitudinal) direction, or in a radial side-to-side direction, or in rotational directions, or in combinations of these directions.

The well may have an elongate tubular configuration defined by a cylindrical wall. The well may be configured to have a limited clearance around the vibrational element once the element is positioned in the well, that is, the well may be configured to be only slightly larger than the vibrational element when the element is in position.

Additionally, the stem may be shaped, dimensioned and configured so that, when vibrating or oscillating in the well during operation, the stem will not touch the tubular wall of the well. This is required so that, during operation of the pretreater, the stem vibrates only within the liquid fuel. This may disturb molecular clusters in the fuel and impart energy to the fuel, but without causing energy to be drained off by contact occurring between the stem and the wall. Accordingly, the clearance between the stem and the wall, and the amplitude of operational vibration of the stem, may be preselected so that a required level of cavitation, turbulence or perturbation may be generated and sustained in the liquid fuel without the vibrational displacement of the stem being high enough to cause contact with the wall.

By way of example only, the body or base of the pretreater may have a length of about 10.2 cm, the well may have a depth of about 7.6 cm, and the stem may have a diameter of about 1.6 cm at its tip.

The vibrational element and the well may be complementarily dimensioned so that, when the free end of the stem is received in the well, it may reach into proximity with a distal end of the well.

The stem may define formations for cavitating or otherwise perturbing or disturbing the liquid fuel as the stem vibrates. Without limitation thereto, such formations may have configurations selected from the group consisting of a cross-shape, a bowl-shaped indentation, concentric rings and spirals.

Each pretreater may have a liquid fuel inlet channel (10060; 11060; 12060) and a pre-treated fuel outlet channel (10070; 11070; 12070).

Figure 10:
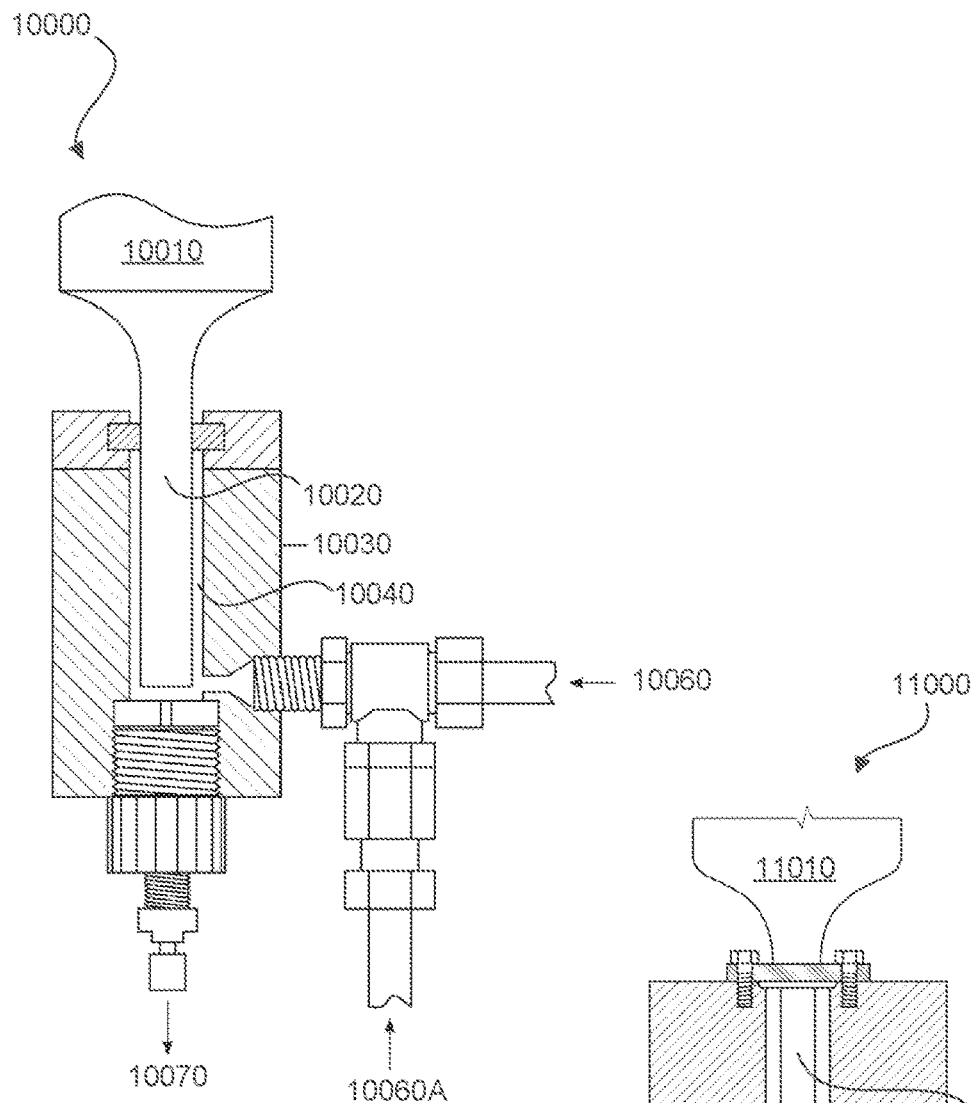
FIG. 10 is a schematic cross-sectional view of a first embodiment of a fuel pretreater.
Figure 11:
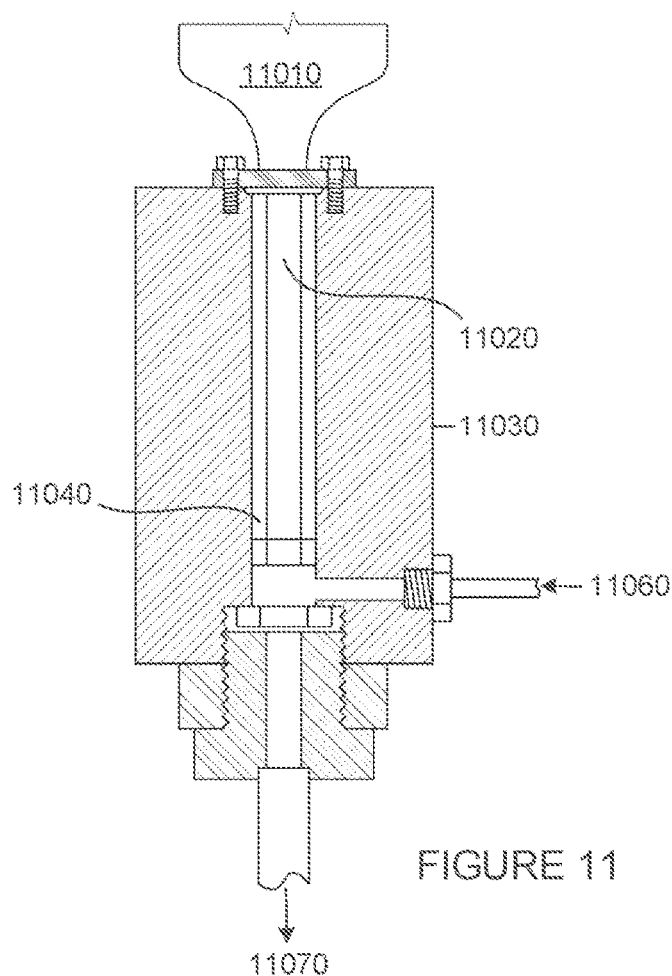
FIG. 11 is a schematic cross-sectional view of a second embodiment of a fuel pretreater.
Figure 12:
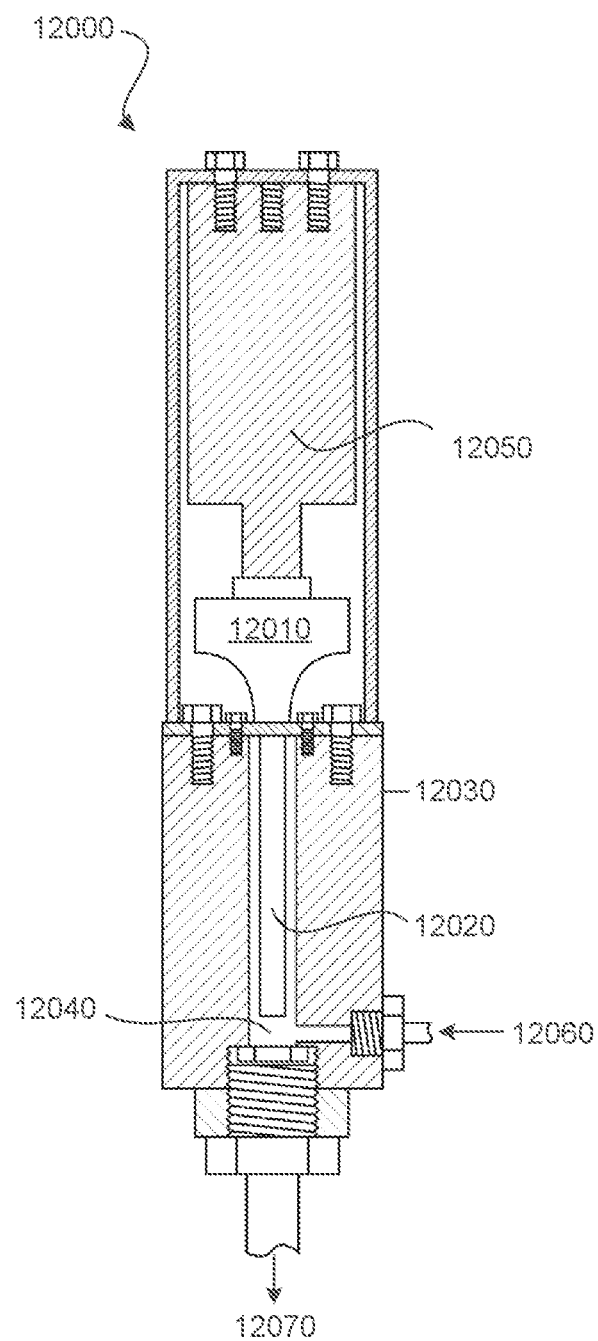
FIG. 12 is a schematic cross-sectional view of a third embodiment of a fuel pretreater.

In the embodiment (10000) shown in FIG. 10, there is an additional line and inlet channel (10060A).

Figure 13:
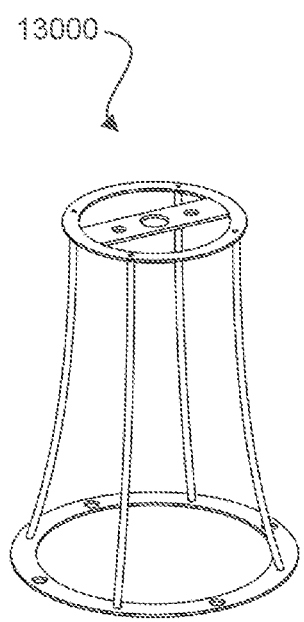
FIG. 13 is a schematic three dimensional view of a mounting frame for mounting a pretreater in a suitable position on the converter.

As shown in FIG. 13, a mounting frame (1300) may be provided for mounting the pretreater in a suitable position on the converter.

The ducting arrangement of the converter may include at least one material selected from the group consisting of ceramics and similar materials having low thermal expansion coefficients, and metal blends. For example, the rod (1138; 1138A), the processing chamber (1120; 1120A; 1120B) and/or the turbulence-inducing devices (4000; 5000; 6000; 7000; 8000; 9000) may include such a material. The metal blends may be sintered upon or embedded in interior or exterior surfaces of the relevant components (or both surfaces). The metal blends may be selected from the group consisting of alloys of Al—Ca, Al—Cu—Li, Cu—Ba, Cu—Sn—K, Cu—Ca—Li, Pt—Li—O, and blends of transition metals such as Pd. The elements of these blends may be provided as varying elemental isotopes.

The fuel treatment system may include a controller (not shown) for automatically controlling the proportion (volume) of carrier gas diverted from the main exhaust flow and passed through the processing chamber, and for controlling the flow characteristics of the gas. The controller may be configured for performing its control functions electronically, mechanically, electro-mechanically, hydraulically and/or pneumatically. In electronic versions, a computing component may be provided. The computing component may be configurable to execute artificial intelligence (AI) algorithms appropriate for adapting to conditions prevailing in the system and its environment, and for learning preferred and favourable settings for controlling exhaust gas diversion through the processing chamber.

A variety of fuels may be used to enrich the carrier gas, either in isolation or in combination with one another. Without limitation thereto, the fuel may be selected from the group consisting of gasoline (also known as petrol), diesel, biodiesel, biomass to liquid (BTL) diesel, gas to liquid (GTL) diesel, fuel oil, bunker oil, aviation gasoline (also known as aviation spirit), jet fuel, natural gas, and methanol.

The heat engine may comprise a combustion engine. The combustion engine may comprise an internal combustion engine (ICE). The combustion engine may comprise an external combustion engine, such as a Stirling engine. The combustion engine may comprise a gas turbine engine.

The drawings show embodiments of a converter. However, it will be appreciated that the invention may also extend to an arrangement of the converter in combination with an engine (or a plurality of engines). Thus, the invention may extend to an engine apparatus (not shown) comprising at least one heat engine, the engine apparatus being fitted with at least one converter as described herein. The heat engine or engines may, for example, comprise one or more internal combustion engines or gas turbines.

The invention may also extend to a vehicle (not shown) which includes a fuel treatment system as described herein. It may extend to a vehicle (not shown) which includes an engine apparatus fitted with a converter as described herein.

Without limitation thereto, the vehicle may be selected from the group consisting of terrestrial, waterborne, aerial, and space vehicles. The vehicle may be selected from the group consisting of motor vehicles in general such as passenger automobiles, buses, trucks, various commercial vehicles, motorcycles, locomotives, watercraft including a variety of boats and ships, aircraft, and the like. The vehicle may be selected from the group consisting of combustion-powered vehicles and hybrid vehicles (vehicles having two or more sources of power).

Figure 14:
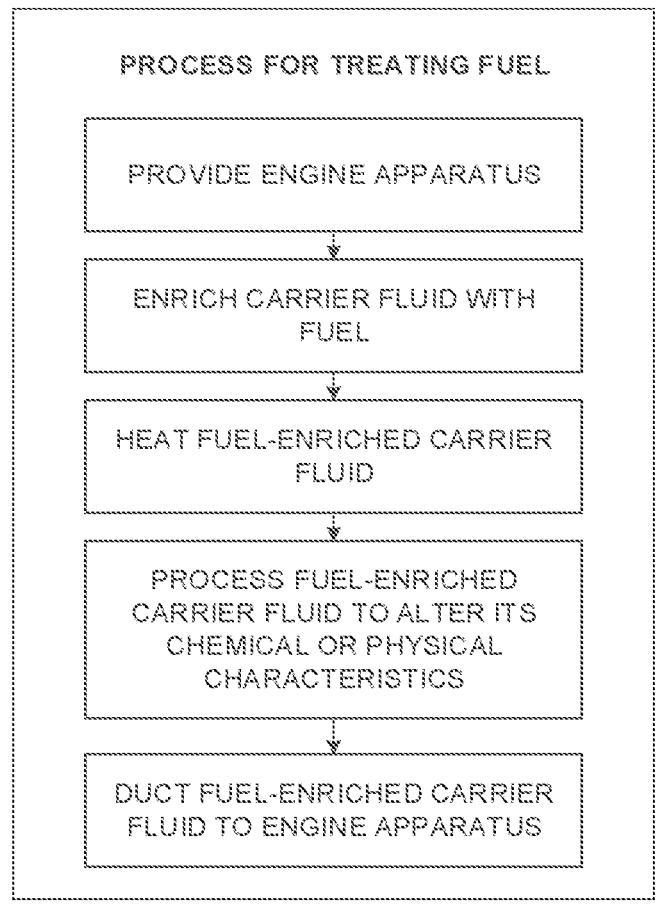
FIG. 14 is a schematic flow chart of a process for treating fuel.

Referring to FIG. 14, an exemplary variant of the described process for treating fuel will now be discussed. In summary, the process involves the following steps: providing an engine apparatus which includes at least one heat engine defining at least one target combustion chamber; enriching a carrier fluid such as exhaust gas with the fuel; heating the fuel-enriched carrier fluid (optionally using heat from an upstream volume of the exhaust gas); processing the fuel-enriched carrier fluid to alter at least one of its chemical and physical characteristics; and ducting the processed carrier fluid into the target combustion chamber or chambers of the engine apparatus.

The fuel-enriched gas may be passed over one or more catalysts and/or metal blends which may promote cracking and/or reforming of the fuel.

Turbulence may be induced in the fuel-enriched gas.

Exemplary steps of the process will now be described in more detail.

The process may be performed by operating an embodiment of the fuel treatment system (1000). During operation, hot exhaust gas from the engine that has passed through the zone HE1 may flow up the central tower tube (1126) and into the exhaust jacket (1124). It may then flow down the exhaust jacket and make a turn into a side port defined in the exhaust jacket. From there it may flow through an exhaust pipe (1140) to a T-junction (1142) and the shunt valve (1116). If the shunt valve is in its open condition, which is typically the case except on start-up of the engine, the main flow of gas passes through the valve and vents to atmosphere via the muffler (1130).

However, a portion of the main flow of exhaust gas is diverted as offtake gas at the T-junction (1142). It flows through the offtake tube (1132) and into the evaporation chamber (1134) of the fuel enrichment component or tower (1112). Its function is to serve as a carrier gas for conveying vaporised fuel to the processing chamber (1120).

The offtake gas may then flow up the evaporation chamber in the space defined between the cylindrical wall of the tower chamber and the cylindrical wall of the central tower tube (1126).

Fuel may be metered into the offtake gas as it rises to the top of the evaporation chamber. The fuelling means (1114) may be employed to accurately meter or dose fuel into the offtake gas, whether by spraying it into the gas stream, by atomizing it, and/or by carrying out any suitable mode for introducing fuel into a gas stream.

At the top of the tower (1112), the fuelling means (1114), which can be provided as a fuel injector such as is common in the art, sprays a fine mist of petrol onto the hot central coaxial tower tube (1126) of the tower, near its top. This injector typically protrudes through the outer wall of the tower (1112) in order to reach into proximity with the hot outer surface of the central tower tube (1126).

The fuel may be at least partially vaporised or evaporated in the evaporation chamber. Advantageously, all the injected fuel is vaporised in this step.

The fuelling means may spray the fuel against the hotter central tower tube (1126). The vaporisation of the fuel may be promoted by heat transferred to it from the hotter exhaust gas flowing inside the central tower tube (1126) and by the action of the fuelling device or devices (1114). During this step the exhaust gas and gasified fuel may become superheated under conditions of oxygen starvation.

In some embodiments of the converter, pressurized injectors operating at about 30 psi (about 2.07 Bar) can be included and can be configured to spray fuel onto the central tower tube for vaporisation at temperatures of the order of about 900° F. (about 482° C.). Such high-pressure, high-temperature vaporisation may promote separation of many typically unused fractions contained in a hydrocarbon fuel. This is a key differentiating feature between the presently disclosed converter and conventional EGR systems like that described in U.S. Pat. No. 5,794,601A1 to Pantone, for example (commonly referred to as a GEET device).

The tower (1112) may include turbulence-inducing and vortex-inducing devices, formations and topography, as described elsewhere in this specification. These devices, formations and topography may be provided in raised structures within interstices in the tower.

From the top of the tower (1112), the fuel-enriched offtake gas may flow into and down the enriched-gas conduit (1122). Whilst flowing down the conduit, the fuel-enriched gas may be heated by the main flow of upstream exhaust gas that is flowing in the same direction down the surrounding exhaust jacket (1124).

During normal operation of the engine and converter, the shunt valve (1116) is typically left open provided that the muffler can generate sufficient resistance or back-pressure to divert an adequate volume of offtake gas needed to supply the conversion process. However, a greater volume of flow through the offtake component may be required during start-up of a converted engine than can be provided by the backpressure. During start-up, therefore, the shunt valve (1116) may be at least partially closed for a short time to promote diversion of the gas into the offtake tube. By way of example only, the shunt valve (1116) may be closed for a period of approximately two minutes after start-up so that most or all the exhaust gas may be diverted into the offtake tube during that period.

After passing down the enriched-fuel conduit, the fuel-enriched gas may flow into and through the processing chamber en route to the target combustion chamber or chambers of the engine apparatus.

The process may include ducting the fuel-enriched carrier fluid over either or both a catalyst and/or metal blend, which may without limitation be selected from those described elsewhere in this document.

In certain embodiments of the invention, the catalyst may be of a type requiring regeneration. In such embodiments, the system may be configured to provide regeneration means as known in the art.

In the embodiments of the converter shown in the drawings, the positioning of the processing chamber (1120) is such that it may be subjected to the highest temperatures in the system. This may serve to increase the rates of reactions taking place in the processing chamber. During operation, therefore, the fuel-gas mixture may be subjected to the hottest temperatures in the system just before it exits the processing chamber. In certain variants of the process, the processing chamber may be heated to temperature in excess of 340° C.

As shown in the drawings, the converter may be connected to an air-intake component of the engine by means of a pipe tee (1144). Here, the processed fuel-gas mixture flowing from the processing chamber may meet and mix with atmospheric air being supplied to the engine. In some embodiments, it may also meet with untreated fresh fuel optionally entrained with the air by a fuel injector (1146). The volume of atmospheric air mixed with the treated exhaust gas may be adjusted by an intake valve arrangement (1148) and may be varied dependent upon changes in ambient temperature, engine speed, engine load, and types of fuel used.

The mixture may then be diverted from the pipe tee (1144) into an engine-intake tube (1150) which connects with the target combustion chamber or chambers (not shown). The target chamber or chambers may be in the same engine as the combustion chamber or chambers from which the exhaust gas originated, or another.

Usually a small relative proportion of the exhaust gas is diverted during steady state operation. The precise proportion of exhaust gas that needs to be diverted and recirculated for given configurations and conditions may be established by routine investigation and experimentation, or with the assistance of suitable algorithms and/or artificial intelligence.

Gas Flow Sequence

Referring to FIG. 2, the main flow of exhaust gas through the primary ducting component is shown by means of arrows having a solid line whereas the flow of offtake gas through the secondary ducting component is shown by means arrows having a broken line.

The primary ducting component—including the exhaust manifold (1128), central tower tube (1126), exhaust jacket (1124) and exhaust pipe (1140)—together serve to conduct the main flow of exhaust gas and exhaust it to atmosphere.

The secondary ducting component—including the offtake tube (1132), evaporation chamber (1134), enriched-gas conduit (1122) and processing chamber (1120)—together serve to conduct offtake gas which has been diverted from the main exhaust flow, and to carry it through the fuel-enrichment and processing stages until it eventually flows into the target combustion chamber or chambers of the engine apparatus.

The flow of gas through the converter may follow the sequence (a) to (i) described below.

a) Arrows "aa": Exhaust gas from the engine may be ported into the exhaust manifold (1128).
b) Arrow "bb": The exhaust gas may then flow through the primary heat jacket or plenum (1119) surrounding the processing chamber, and into the central tower tube (1126).
c) Arrows "cc": The exhaust gas may flow up the central tower tube and into the exhaust jacket (1124) which surrounds the enriched-gas conduit (1122).
d) Arrow "dd": From there the bulk of the gas may be exhausted or dumped to atmosphere via the exhaust pipe and muffler (1130).
e) Arrow "ee": A portion of the gas (the offtake gas) may be diverted from the main exhaust flow by backpressure or by closing of the shunt valve (1116). The offtake gas may then flow through the offtake tube (1132) into the fuel enrichment component (1112).
f) Arrow "ff": The offtake gas may be enriched with fuel by the fuelling device or devices (injectors) and may be substantially entirely vaporised in the evaporation chamber (1134). It may then flow up the outside of the central tower tube (1126), and from there into the enriched-gas conduit (1122) running inside the exhaust jacket (1124). The fuel-enriched gas may be heated by the hotter exhaust gas flowing in the surrounding exhaust jacket (1124).
g) Arrow "gg": The fuel-enriched gas may flow out of the enriched-gas conduit and into an inlet zone of the processing chamber (1120).
h) Arrow "hh": The fuel-enriched gas may flow through the processing chamber. Here it may interact with the catalyst or catalysts and with the metal blends. Turbulence may also now be induced.

i) Arrow "ii": The processed gas may then flow into the pipe tee (1144) where it will typically meet and mix with inlet air entering through the conventional engine air-intake unit. Thus, fuel that has been converted by the described system may be carried to the engine for combustion in much the same way as fuel is conventionally introduced into an engine, by entrainment with ambient air. The treated fuel may be applied at existing multi-ports or throttle bodies of the converted engine.

Preferred embodiments of the converter may be configured and operated so that they convert all the fuel entering the engine. In less preferred embodiments of the converter (not shown), fresh (untreated) fuel may optionally be added to the pre-cylinder mixture before it flows into the engine's combustion chambers.

Figure 15:
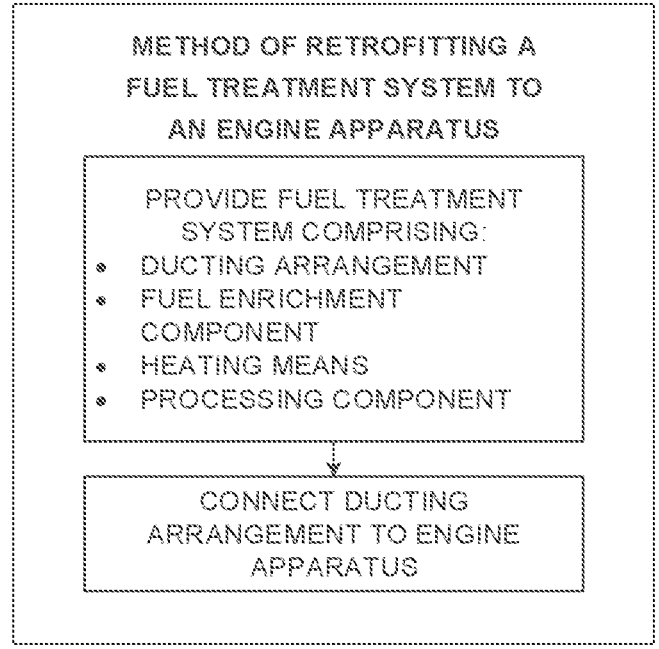
FIG. 15 is a schematic flow chart of a method of retrofitting a fuel treatment system to an engine apparatus.

Referring now to FIG. 15, an exemplary variant of a method of retrofitting a fuel treatment system to an engine apparatus is provided. The engine apparatus may comprise at least one heat engine defining one or more target combustion chambers. The method may involve providing a fuel treatment system which comprises the following components: a ducting arrangement configured for ducting a carrier fluid into the target combustion chamber or chambers; a fuel enrichment component configured for enriching the carrier fluid with fuel upstream of the target combustion chamber or chambers; heating means for heating the fuel-enriched carrier fluid; and a processing component configured to alter at least one chemical and/or physical characteristic of the fuel-enriched carrier fluid.

Typically, the method further includes connecting the ducting arrangement to the engine apparatus in fluid communication with the target combustion chamber or chambers.

Test and Results

Tests were conducted to compare an exemplary embodiment of the described system (a converted engine) with an unconverted engine (a reference engine).

The engine used for testing was a 2-cylinder, 4-stroke Military Standard petrol engine with a capacity of 16 in$^3$ (262 cm$^3$), manufactured by the Wisconsin Motor Corporation.

Fuel Economy and Consumption

In testing, the described system and process improved fuel economy. As illustrated by Table 1 below, the fuel consumption of the converted engine was lower than that of the reference engine. The mean fuel consumption of the converted engine was 1.7 dm$^3$ gasoline/h (normalized to a nominal rated power output of 1500 W). The liquid gasoline flow value was calculated from the original mass flow values using a gasoline density of 750 g/dm$^3$. The fuel consumption for the reference engine was 2.8 dm$^3$ gasoline/h flow. However, the specification for the reference engine was 2.4 dm$^3$/h (and when running rich, a value closer to 2.8 was found).

Comparing the fuel consumption of the converted engine to that specified for the reference engine, the fuel consumption of the converted engine was approximately 69% that of the reference engine during testing, when normalized for power output. These figures are presented for illustrative purposes only and the applicant does not maintain that they will be repeatable.

TABLE 1

Fuel consumption of converted and reference engines

| Engine Type | Fuel Consumption (Gasoline Flow) [dm$^3$/h] | Comment |
| --- | --- | --- |
| Converted Engine [1] | 1.7 | Compensated for power difference |
| Reference Engine [1] | 2.4 [2] | 2.8 dm$^3$/h at rich operation ($\lambda < 1$) [4] |
| Ratio of Fuel Consumption (Converted Engine/Reference Engine) | 0.69 [3] | |

Notes:
[1] The reference engine was equipped with carburettors whilst the converted engine was equipped with fuel injectors.
[2] According to military engine specification at 1500 W power.
[3] Normalized for equal power output.
[4] $\lambda$—Air/fuel equivalence ratio.

The improvements in fuel economy tabulated above were unexpected and significant.

System Temperatures

Temperatures were measured at seven different locations (see above) in the converted engine. In the reference engine only the exhaust temperature was measured.

Table 2 below shows temperatures measured with thermocouples at various sampling locations around the converted and reference engines. The sampling locations were as follows: $T_1$—Engine out; $T_2$—Exhaust before tower; $T_3$—Exhaust to atmosphere; $T_4$—Fuel mixture before processing; $T_5$—fuel mixture after processing; $T_6$—Intake air-fuel mix; $T_7$—Intake air. FIG. 2 illustrates the approximate locations of the thermocouples $T_1$ to $T_7$.

TABLE 2

Examples of stable temperature measurements by thermocouples $T_1$ to $T_7$

| Engine Variant | $T_1$ [° C.] | $T_2$ [° C.] | $T_3$ [° C.] | $T_4$ [° C.] | $T_5$ [° C.] | $T_6$ [° C.] | $T_7$ [° C.] | Mean Power [W] |
| --- | --- | --- | --- | --- | --- | --- | --- | --- |
| Converted engine without H$_2$O[1] | 729 | 618 | 482 | 346 | 446 | 189 | 135 | 1360 |
| Converted engine with H$_2$O[2] | 728 | 605 | 459 | 243 | 429 | 223 | 123 | 1340 |
| Reference engine | | | 563 | | | | | 1400 |

Notes:
[1] Without water injection.
[2] With water injection.
As can be seen, exhaust gas was able to heat the processing chamber to temperatures exceeding 420° C.

A lower temperature was seen for exhaust gas venting to atmosphere ($T_3$) in the case of the converted engine, suggesting that heat transfer to the evaporation chamber (1134) and the enriched-gas conduit (1122) may have taken place during conversion, possibly contributing to cracking and/or reforming reactions within the fuel. As expected, the injection of water decreased the exhaust-out temperature even more.

There was very little effect on the exhaust temperature at engine-out ($T_1$).

Gas Analysis

Analysis of gas-phase compounds was also conducted to investigate whether the composition of the fuel flowing through the converter would change prior to and after flowing through the converter (and through various sections of the converter). Gas was sampled at three locations on the converter. Referring to FIG. 2, the three gas sampling positions are designated by reference numerals $C_1$ to $C_3$.

The gas analysis was conducted using a purpose-built system based on a Thermo Scientific C2V-200 Micro GC with four columns each having a 5 m length and four channels.

The following compounds were analysed: hydrogen; carbon dioxide; unsaturated hydrocarbons (including ethylene and 1-butene); polyaromatic compounds (including naphthalene); benzene; toluene; methane; and carbon monoxide.

Table 3 tabulates the results of the gas analysis. Sampling conducted prior to fuel enrichment ($C_1$), after fuel enrichment ($C_2$), and after processing ($C_3$) revealed that the following changes may have occurred: a change in fuel composition; cracking or reforming reactions (e.g. cracking and/or reforming of hydrocarbons and polyaromatic hydrocarbons such as naphthalene); production of increased concentrations of hydrogen, methane and 1-butene; and reductions in the concentration of polyaromatic compounds and toluene.

TABLE 3

Gas analysis results

Run Date: 29 Nov. 2016

| Sampling Location | $C_1$ Untreated exhaust gas (at venting to atmosphere) | $C_2$ Fuel-enriched exhaust (carrier) gas before processing component | $C_3$ Fuel-enriched exhaust (carrier) gas after processing component |
|---|---|---|---|
| Run Time | 12:37 | 15:57 | 14:20 |
| Component | vol % | vol % | vol % |
| $CO_2$ | 13.21 | 12.57 | 8.53 |
| $C_2H_4$ | 0.01 | 0.02 | 0.07 |
| $C_2H_6$ | 0.00 | 0.00 | 0.01 |
| $C_2H_2$ | 0.00 | 0.00 | 0.02 |
| 1-Butene | 0.00 | 1.19 | 4.24 |
| $C_6H_6$ | 0.00 | 0.00 | 0.17 |
| $C_7H_8$ | 0.00 | 0.17 | 0.07 |
| $O_2$ | 1.84 | 1.40 | 2.67 |
| $N_2$ | 84.60 | 83.30 | 82.31 |
| $CH_4$ | 0.00 | 0.00 | 0.15 |
| CO | 0.24 | 0.97 | 1.14 |
| $H_2$ | 0.08 | 0.39 | 0.63 |
| Total | 100.00 | 100.00 | 100.00 |

Run Date: 30 Nov. 2016

| Sampling Location | C1 Untreated exhaust gas (at venting to atmosphere) | C2 Fuel-enriched exhaust (carrier) gas before processing component | C3 Fuel-enriched exhaust (carrier) gas after processing component |
|---|---|---|---|
| Run time | 12:39 | 10:38 | 10:25 |
| Component | vol % | vol % | vol % |
| $CO_2$ | 13.07 | 12.34 | 11.63 |
| $C_2H_4$ | 0.02 | 0.00 | 0.02 |
| $C_2H_6$ | 0.00 | 0.00 | 0.00 |
| $C_2H_2$ | 0.00 | 0.00 | 0.00 |
| 1-Butene | 0.01 | 1.30 | 1.48 |
| $C_6H_6$ | 0.08 | 0.13 | 0.16 |
| $C_7H_8$ | 0.19 | 0.18 | 0.18 |
| $O_2$ | 1.51 | 1.35 | 1.95 |

TABLE 3-continued

Gas analysis results

| $N_2$ | 84.10 | 83.20 | 82.76 |
|---|---|---|---|
| $CH_4$ | 0.00 | 0.01 | 0.00 |
| CO | 0.71 | 0.90 | 1.06 |
| $H_2$ | 0.30 | 0.60 | 0.76 |
| Total | 100.00 | 100.00 | 100.00 |

Condensate Analysis

Condensates trapped in the gas analysis cooling systems were analysed. The condensate samples were analysed using a Varian CP-3800 Gas Chromatograph equipped with a Flame Ionization Detector (GC-FID) and a CP-Sil 5 column (30 m×0.25 mm internal diameter and 0.5 μm film thickness).

A general observation was that the condensate had a dark colour when taken prior to the converter and a lighter colour (substantially clear) when taken after the converter. This may be suggestive of cracking reactions taking place during the conversion process.

Figure 16:
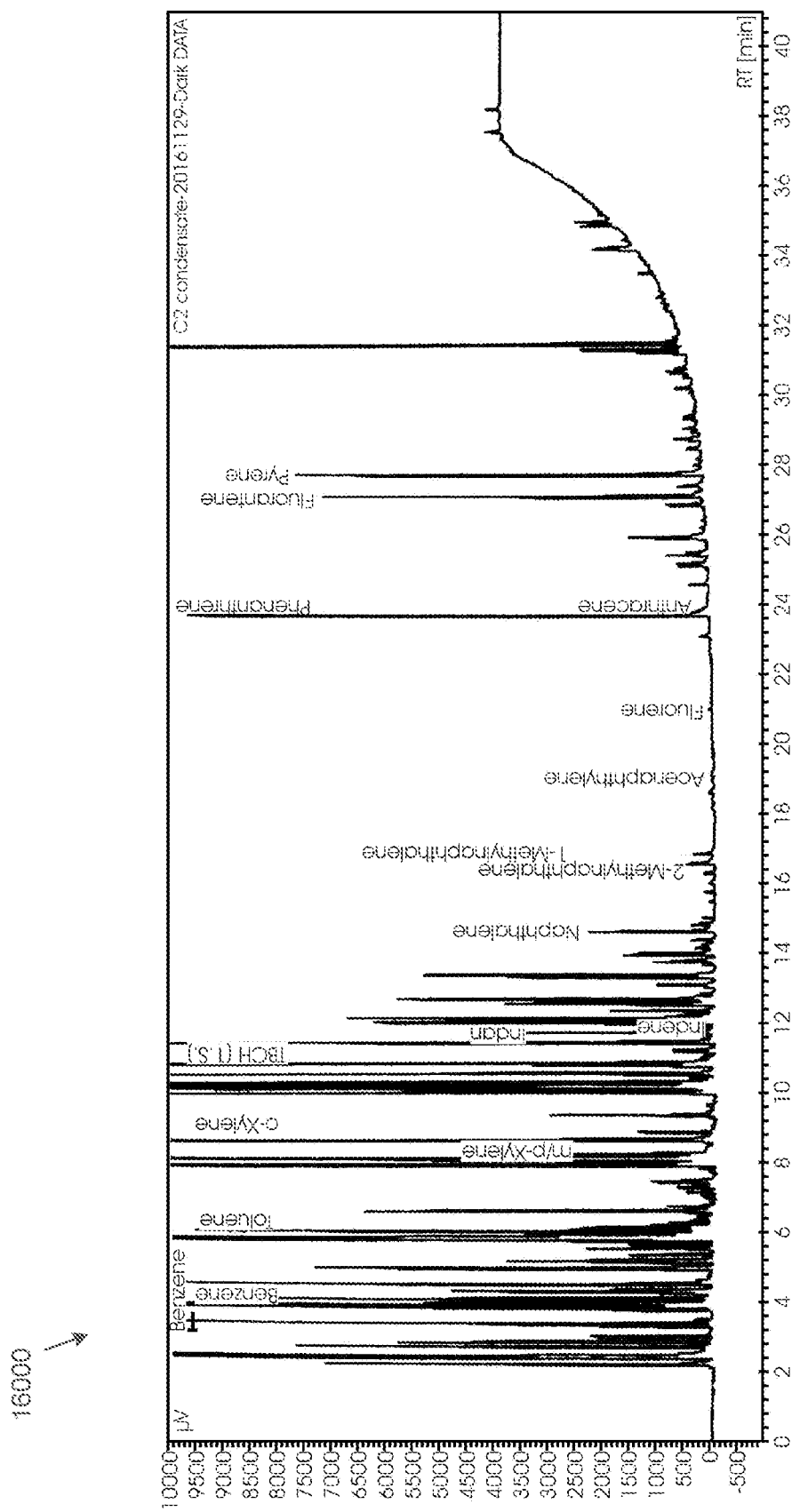
FIG. 16 is an exemplary gas chromatogram of a condensate recovered from an exhaust gas before treatment using the described fuel treatment system.

FIGS. 15 and 16 show gas chromatograms derived from the GC-FID analysis of condensates of gas before and after passage through the converter.

Figure 17:
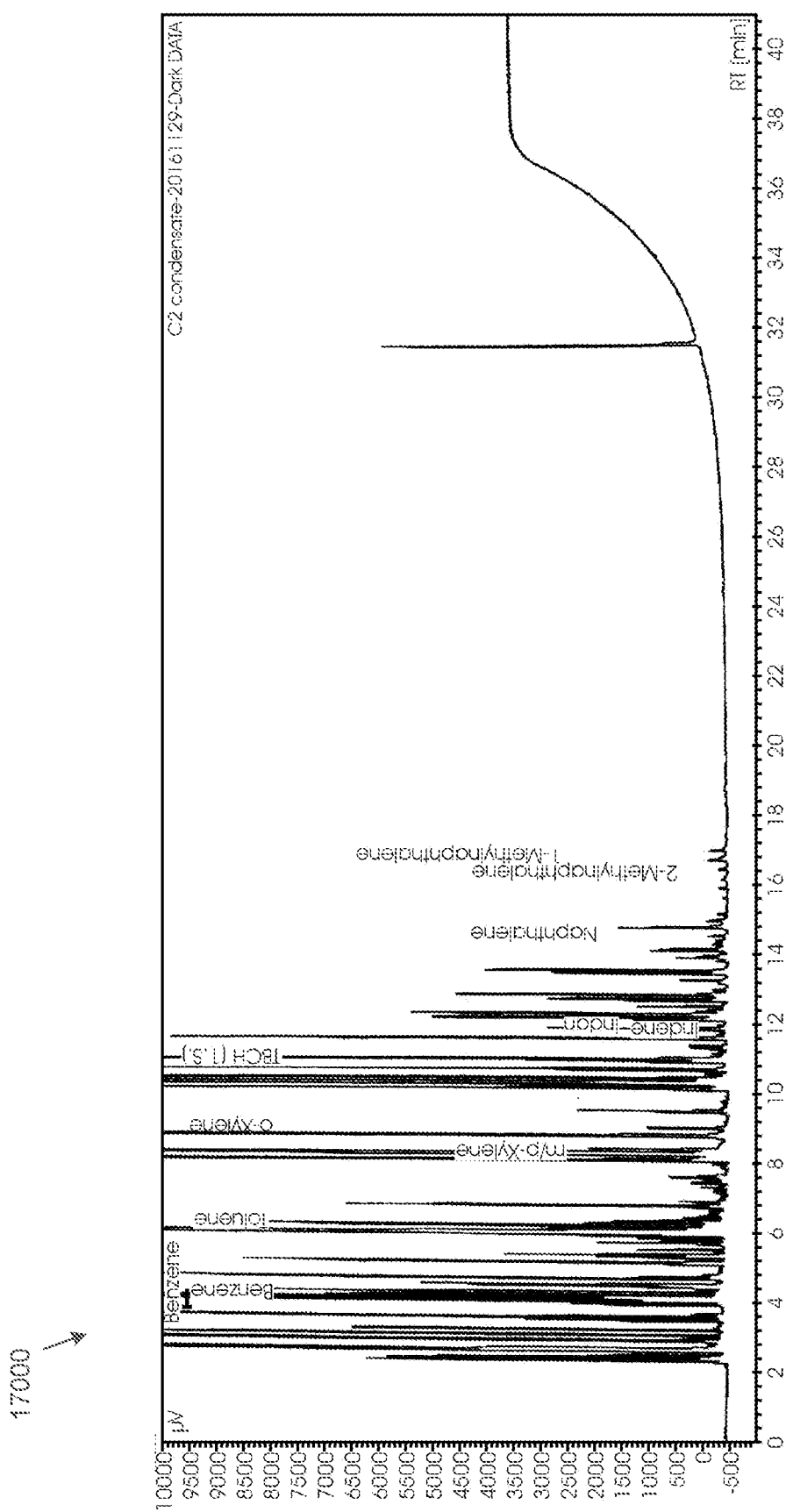
FIG. 17 is an exemplary gas chromatogram of a condensate recovered from an exhaust gas after treatment using the described fuel treatment system.

The chromatogram (16000) shown in FIG. 16 is a reference chromatogram relating to a condensate from gas sampled before passage through the converter, i.e. prior to treatment by the converter. The chromatogram (17000) shown in FIG. 17 relates to a condensate from gas sampled after passing through the converter. In both cases the X axis depicts the number of minutes taken for a given peak to appear, i.e. the relevant retention time. The Y axis depicts μV.

The chromatogram (16000) shows a multitude of peaks to the right, representing the presence of numerous high molecular weight compounds mixed in the initial fuel (including pyrene and fluoranthene, for example).

The right-hand side of the chromatogram (17000) has been significantly smoothed out by comparison with the chromatogram (16000). Most of the high molecular weight compounds have been either significantly reduced or eradicated altogether.

In the chromatograms there is evidence of the conversion of high-molecular-weight hydrocarbons into compounds with a less complex structure. The results showed that the condensate associated with gas sampled before the converter contained more high-molecular-weight hydrocarbons than that associated with gas sampled after the converter. This may be deduced by looking at the peaks on the right-hand side of the respective chromatograms (16000; 17000), especially those peaks associated with retention times exceeding 18 minutes. The chromatogram (17000) for the condensate sampled after the converter is substantially devoid of peaks representing high-molecular-weight hydrocarbons. The implication is that converted fuel that is introduced into an engine may contain fewer complex hydrocarbons with high molecular weight. From an environmental point of view this may be beneficial. From the point of view of efficiency, shorter carbon-chained substances may be expected to be more easily combusted.

The test results suggested that droplets of liquid fuel leaving the processing chamber may have shown signs of surface tension changes. The surface tension of the fuel leaving the processing chamber was reduced by a percentage ranging from 3% to a 5% (approximately) compared to that entering the chamber. Lower surface tension may promote fuel efficiency since it may permit faster disintegration and evaporation of any remaining fuel droplets not vaporised in the preceding steps.

Without committing to any theory of the mechanism of operation, it is surmised that the distributed orientation state of hydrocarbon molecules on the surface of the droplets may have experienced relaxation during conversion. The value of surface tension is determined not only by the force of molecular attraction, but also by the molecular orientation state on the surface of liquid fuel.

Further tests showed that the infrared absorption of the fuel/gas mixture increased from a level of 1.2 (approximately) for the mixture entering the processing chamber, to a level in excess of 3.4 (approximately) for that leaving the chamber, i.e. more than a two-fold increase. The infrared absorption spectrum of a fuel may provide an insight into its molecular structure because the wavelengths of movement, vibration and resonance of fuel molecules may lie within the wavelengths of the infrared band. The above test result suggests that the polarization feature and transitional dipole moments of the fuel molecules were altered during conversion, possibly due to displacement of their atoms and changes in the magnetic moment of the molecules.

Further tests showed that the ultraviolet absorption (at 320 nm) of the fuel/gas mixture increased from a level of 1.75 for the mixture entering the processing chamber, to a level of 2.3 for that leaving the chamber, i.e. more than 30% increase. The ultraviolet absorption increased with increasing wavelength (decreasing frequency), peaking at 320 nm. This suggests that the transition probability of electrons in the pi-bond conjugated system among different energy levels may have increased during conversion. Since the transition of bond electrons from ground level to excited levels may be an important feature of molecular radicalization, it is surmised (without committing to the theory) that splitting of C=C bonds within the fuel and oxidation of its rings may have been accelerated and more thoroughly completed, thereby boosting combustion efficiency.

In summary, given the above test results, it is surmised that the described system and process may promote the breakdown of bonds between atoms of hydrocarbon chains and rings in the fuel, resulting in decreased fuel density and fuel surface tension. This may promote the presence of smaller fuel particles and droplets during atomization and injection into internal combustion engines. Smaller particles and droplets may promote increased evaporation rates of the various fractions present in commercial fuel. They may also promote mixing of the fuel and oxidizer (e.g. air) and also promote the oxidation process. The net effects may include an increase in the rate of combustion, an increase in power and a reduction in the emission of pollutants.

Possible Mechanisms and Reactions

Instead of seeking to improve the efficiency of an engine by modifying the engine itself, the described system was designed with the aim of altering the chemical composition of fuel prior to combustion in the engine, thereby to promote the engine's fuel efficiency.

Several mechanisms and reactions may be at play during the conversion process and may contribute to the results discussed above. Possible mechanisms and reactions are presented for consideration here, but no inference should be drawn that any or all of them take place during the process.

It may be surmised that, as the fuel is conveyed through the processing chamber, chemical reactions related to cracking, reforming, break-down, transmutation, and/or morphed reassembly of different compounds may occur. The effects may result from at least one process selected from the group consisting of heating, turbulence, and catalytic properties of the metals and catalysts used in the processing chamber.

The effects may, instead or in addition, be linked to decreased particle and droplet sizes of treated fuel flowing from the converter into the engine.

Reforming processes may be at work in the converter during operation. Multiple chemical processes typically take place during reforming. These may include isomerization and dehydrocyclization of alkanes; dehydrogenization of cyclohexanes to aromatic hydrocarbons; and/or isomerization and dehydrogenation of alkylcyclopentanes. Reformates may consist of various kinds of aromatics such as toluene, benzene and xylene. An increase in toluene concentration can be seen in the gas analysis results set out in Table 3.

References [3] to [5] set out below describe possible reaction pathways that may take place during processing. These may include:

The steam reforming reaction, $C_mH_n + m\ H_2O \rightarrow m\ CO + (n/2+m)\ H_2$ The water-gas shift reaction, $CO + H_2O \leftrightarrow CO_2 + H_2$ (slightly exothermic)

Methane decomposition, $CH_4 \rightarrow 2\ H_2 + C\ (s)$

Changes effected by the converter may promote more efficient combustion of hydrocarbons contained in the fuel. The results of tests suggest that the converter may change the chemical composition of the fuel mixture inside the processing (cracking) chamber, breaking down high molecular hydrocarbons into smaller molecules that can be used more efficiently by the combustion engine, and which may have a higher octane rating. Use of the converter may also provide a reduction in the quantity of unburnt fractions of fuel. Thus, use of the converter may permit certain fractions present in fuel, which are currently unused by conventional engines (i.e. unconverted engines), to be more fully exploited thereby increasing the energy output achieved by burning such fuel. During conventional (unconverted) engine operation, such fractions may travel through the engine unused and present a problematic component needing post-combustion treatment.

Cracking and reforming reactions are generally endothermic. The heating value of the resulting gas mixture may therefore be expected to be higher. The energy required for the endothermic cracking and reforming reactions is taken from the exhaust gas. Heat recuperation may provide a reason for efficiency improvements. Instead of taking energy from the engine to remove pollutants from the exhaust gas (conventional practice), the described system and process may instead permit more work to be extracted from an engine while reducing pollutants in the exhaust.

It may be surmised that by converting high-molecular-weight hydrocarbons (especially polyaromatic hydrocarbons) into hydrocarbons with less complex structures, the described system may promote combustion efficiencies, which may more than compensate for efficiency losses caused by a decreased density and volumetric efficiency of the combustion mixture caused by heating. It is possible that conversion of high-molecular-weight hydrocarbons (especially polyaromatic hydrocarbons) into hydrocarbons with less complex structures may promote combustion of the fuel. Methane is not typically constituent in gasoline but can be formed in cracking reactions, especially if thermal cracking is used.

The observed effects may instead or in addition be related to an acceleration of the oxidation of C=C rings within molecular constituents of the fuel. This may result in more complete oxidation of a converted fuel during combustion, leading to gains in combustion efficiency.

It may be surmised that changes to fuel composition are effected by physical features and properties of the processing chamber. These features may include its topology, its means for inducing turbulence and vortex motion, its mixed-metal compositions and its catalysts. It may further be surmised that these features permit freed ions and electrons generated upstream of the processing chamber, moving in the gaseous mix, to give rise to magnetic effects, separation of charges, and cloud field charge effects.

The results of the testing discussed above may be unexpected and surprising in the light of conventional teaching that the temperatures generated by internal combustion engines are insufficient to yield such outcomes. Industrial-scale reforming processes typically take place in temperature conditions of 500° C. to 530° C. and at a pressure rating of 2 kg/cm$^2$ to 25 kg/cm$^2$ under the influence of a catalyst. The maximum temperatures measured in the converter during testing (see Table 2) were lower than this range; those skilled in the art would therefore be unlikely to consider the presently described system and process to have the potential to sustain reforming reactions. Furthermore, when industrial-scale reformation processes are carried out the hydrogen which is generated is often collected and recycled for use in other refinery processes such as hydrodesulphurization processes. Conventional wisdom may therefore teach away from the use of hydrogen as a promoter of fuel reforming processes.

It may also be surmised that an increase in the hydrogen content of the fuel takes place during conversion, thus promoting leaner operation of the engine. The increased hydrogen presence may permit the timing angle of converted engines to be decreased in the direction of top dead centre, since a faster flame front under spark ignition is promoted.

Petrol and diesel fuels contain many hydrocarbon fractions and radicals. As the temperature of the fuel is elevated, more of these fractions emerge as a vapour which can be used by an internal combustion engine. This can change the nature of the flame front in a given engine and therefore the speed of ignition, so that the extent of expansion of the fuel upon on the cylinder head is greater. The burning of the fuel under these circumstances is also more complete.

Without committing to the veracity of the following statements, it is surmised that the treatment of the fuel with the disclosed converter may transform the fuel charge so that it moves closer in its composition to the simplicity which would be the case if all the fuel were hydrogen. In the case of all the fuel being hydrogen, one would need to change the engine ignition timing close to top dead centre. It is surmised, accordingly, that operation of the disclosed converter may permit the ignition timing advance of converted engines to similarly be reduced to being closer to top dead centre without increasing the likelihood of pinging or knocking.

Engine manufacturers have conventionally addressed knocking using electronically controlled knock sensors designed to change engine parameters within limits. The presently disclosed converter may address the problem by providing a similar effect as increasing the octane rating of a given fuel (but without the user having to pay more for the fuel), by releasing more unused fractions available in the fuel before application to the cylinder.

Operation of the presently disclosed converter does not depend upon the addition of water to the fuel, nor upon the bubbling of fuel vapour through water as in the case of EGR systems like that disclosed in U.S. Pat. No. 5,794,601A1 to Pantone. That system relies for its functioning upon the addition of water to the hydrocarbon fuel. In stark contrast thereto, the presence of water in a fuel charge treated by the presently disclosed converter may instead be expected to degrade its performance, since the disclosed converter functions differently than previously known EGR systems.

For purposes of the present invention it is not advantageous to have the fuel be cooled after vaporisation in the tower. Instead, the disclosed converter is configured to heat and to retain as much heat as possible in the fuel charge as it travels to the engine cylinders to be combusted.

This is an important point of distinction over previously known EGR systems. Others practising the art would typically attempt cooling of the processed fuel mix before it is allowed to enter an engine. Therefore, the favourable test results that were achieved for the presently disclosed converter may be surprising in the light of conventional teaching which suggests that the heating of a combustible fuel mixture usually leads to a decrease in efficiency rather than an increase.

It is surmised that, contrary to the conventional understanding of those skilled in the art, keeping the vaporous fuel charge hot on its way to the cylinders may result in a cooling effect rather than causing increased temperatures in the engine. This outcome was suggested by the results of testing of the disclosed converter. Without commitment to the veracity of the following statement, it is surmised that this may be a possible reason for reduced nitrogen oxides (NOx) concentrations which were observed in emissions from converted engines (versus concentrations generated by similar engines that had not been converted), during testing of the disclosed converter.

To promote the maintenance of heat in the disclosed converter, the fuel injectors in the system may be positioned as far downstream from the exhaust manifold of the engine, and as close to the inlet zone of the processing component, as is practically feasible, so that heat loss from the fuel is inhibited. For example, the secondary ducting component may be configured so that the flow path (ff) to be travelled by the fuel-enriched gas along the enriched gas conduit (1122) and on towards the processing chamber, is kept as short as practically feasible. An arrangement of this type may be referred to as "remote injection".

Heat maintenance may also be promoted by the adjacent and counter-current arrangement of the plenum inlet and the processing chamber outlet. Certain conventional fuel conversion systems, such as that disclosed in U.S. Pat. No. 7,207,323B1, are configured to provide transverse flow of exhaust gases over multiple reactor tubes. By contrast, embodiments of the presently disclosed converter may employ a coaxial tube arrangement whereby the inner processing chamber (1120) is arranged coaxially inside the outer plenum (1119). Respective inlets and outlets to the plenum and the processing chamber can be arranged on opposite end regions of these two components, so that hot exhaust gas from the engine can be ducted in a generally opposite direction to fuel-enriched carrier gas flowing in the processing chamber. A common cylindrical wall may be shared between the plenum and the processing chamber so that the hot exhaust gas from the engine and the fuel-enriched carrier gas can flow on opposite sides of, and in contact with, the common wall, thereby permitting heat transfer to take place from the hottest volumes of the exhaust gas to the carrier gas flowing in the processing chamber. This configuration may permit maximal heating of the finished fuel mix to take place just before the mix enters the engine.

To further inhibit heat loss from the fuel, vapour carrying lines and channels leading to the engine's intake ports may be thermally insulated.

Iron and other ferrous metals are typically avoided in preferred embodiments of the processing component, since these may interfere with and inhibit magnetic field shear caused by relative ionic movement in the gases passing through the inner (1120) and outer (1119) tubes of the processing component (1118). Thus, tube boundaries and walls segregating the flow of gases may advantageously be made from materials which are non-ferrous, but which have good heat conducting properties.

A further restriction in the use of materials is required for embodiments in which the fixed rod (1138; 1138A) is electrically driven; here the rod must be made of a conductive metal to permit the conduction of electricity.

The coaxial tubular arrangement of the processing chamber inside the plenum may permit lower exhaust back-pressures to prevail than are typically found in certain other types of fuel conversion systems (e.g. in the system disclosed in U.S. Pat. No. 7,207,323B1). In such systems the exhaust gas is either constrained to flow transversely over reactor tubes, being thereby obstructed by them, or the feed fuel and exhaust gas are forced into each other. By contrast, in the presently disclosed converter the exhaust gas in the plenum can flow in alignment with the inner processing chamber rather than transversely across it, and the fuel feed can be introduced into the offtake exhaust gas in a concurrent flow direction instead of a conflicting direction.

It was noted during testing of the presently disclosed converter, that adding injected water under a pressure of 30 psi (approximately 2.07 Bar) did not promote the combustion process but instead caused a reduction in engine efficiency, which stands in contrast to what is claimed for the apparatus disclosed in U.S. Pat. No. 5,794,601A1 to Pantone.

Treatment or conversion of fuel using the presently disclosed converter may be expected to promote increased heating values of the converted fuel, leaner running, simplified combustion leading to higher efficiency, fuel savings, a reduction in the percentage of unburned fuel present in exhaust gas, lower levels of polyaromatic emissions, and a possible increase in the octane rating of a converted fuel.

It will be appreciated that refinements could be made to the converter to make it more stable and robust and to improve fuel economy beyond that which was measured during testing.

For example, changes could be made to the configuration and layout of the ducting arrangement, particularly in the regions of the fuel enrichment and processing components, to promote better heat recuperation and transfer. Improvements to insulation could also be made to promote the maintenance of higher temperatures in the converter, especially around vapour carrying lines and channels.

Other possible refinements could include adjustments to the ratio of recycled exhaust gas to fuel volume, modifications to the turbulence-inducing and catalytic structures of the processing component and to its materials of construction, the development and incorporation of processes and devices to increase hydrogen presence, and refinements relating to engine and converter start-up procedures that may reduce the running time required to achieve stable operation.

Routine experimentation could also be conducted to refine engine parameters for better efficiency and to determine suitable proportions of exhaust gas recirculation required for different types of engines and conditions.

The fuel treatment system described herein may be expected to crack high-molecular-weight hydrocarbons contained in the fuel into shorter, less complex structures. This is an endothermic reaction that may create a fuel with a higher heating value than that of the original fuel. The energy to perform this cracking may be provided by recycled heat from the exhaust gas.

The system may convert heat, which is normally wasted in a combustion engine, into usable energy. This may increase the efficiency of the engine, improve fuel consumption and lower emissions of polyaromatic compounds and particulates. The process may be aided by structural features of the system that are configured to generate vortices. It is surmised that the generation of these vortices may add energy to the fuel charge. It is also surmised that the treatment process may be aided by magnetic shear resulting from ionic movement within the fuel mix as portions of the exhaust gas (raw or fuel-enriched) move in opposite directions within the system.

Thus, ions in the exhaust gas and the fuel-enrich carrier gas, moving in opposite directions, may give rise to electrical effects and then to contra-directional magnetic fields, interacting at a distance through the non-ferrous wall of the inner, coaxial processing chamber. Magnetic shear at the boundary between the plenum and the processing chamber may result in reconstituted, oppositely polarized electrical fields opposing ions in the gaseous mixtures, causing breakdown of petroleum radicals.

The electrically driven rod (1138; 1138A) at the centre of the processing chamber may further promote this cracking action.

The presently disclosed converter is not critically dependent for its functioning upon the use of catalysts, although one or more catalysts may be included as an optional feature. The systems described in EP2216537A1, US2014260203A1, U.S. Pat. No. 5,794,601, WO2019157581A1, US2014216030A1, JP2008223537A and U.S. Pat. No. 7,207,323B1 depend for their functioning upon the presence of standard catalysts. The systems disclosed in U.S. Pat. Nos. 5,794,601 and 7,207,323B1, for example, rely upon standard catalysts such as oxides of nickel, copper and zinc.

By contrast, the presently disclosed converter may function without the presence of a catalyst. It can rely instead on turbulence and vortex effects, heat, magnetic field shear, and vibrations. Consequently, components of the converter can be made from a variety of ceramic materials having a low thermal expansion coefficient, or even from non-ferrous metals such as alloys of Al—Ca, Al—Cu—Li, Cu—Ba, Cu—Sn—K, Cu—Ca—Li and others.

The disclosed converter also does not require certain other components which are critical to the functioning of previously known systems (such as the means for mixing water and fuel that is an essential component of the system of U.S. Pat. No. 5,794,601).

Without committing to the veracity of the following statements, the effects of the presently disclosed converter upon fuel may be ascribable, at least in part, to the following features of its construction, amongst others:

its features of topography and configuration (such as its turbulence-inducing and vortex-inducing structures, grooves, channels and Schauberger formations and topography), particularly those present in and around the tower and the processing component, which may generate or transfer energy associated with vortex and plasma effects, as well as implosive energy, which energy may be transferred to the fuel present in the fuel-enriched carrier gas;

the configuration of its heat exchanging components, which may permit the hottest segments of raw exhaust gas to heat the pre-cylinder fuel charge in the processing chamber shortly before the charge enters the engine for combustion; and the configuration of the converter's ducting arrangement, having adjacent portions configured to provide countercurrent flow, which—in combination with the optional electrically charged rod—may generate electrical charges and cause magnetic, ionic or plasma effects thereby altering the chemical structure of the fuel-enriched carrier gas.

It is further surmised that entropy in the fuel may be induced or accelerated by gas flow over the spiral formations and other internal structural pathways that are based on natural mathematical sequences, such as the Fibonacci sequence, which may in turn contribute to hydrocarbon breakdown.

The configuration of the disclosed converter may also reform components of the fuel to create additional hydrogen within the fuel.

A significant feature of the disclosed converter that may differentiate it from EGR systems, is that all the fuel destined to be combusted by an engine may be directed through the converter and subsequently through the engine. The fuel may be introduced to the converter in liquid form.

In summary, the presently disclosed converter may employ heat and turbulence, rather than catalysis, as its primary mechanism for cracking the fuel. The fuel is vaporised at high temperatures in the tower and the fuel-enriched gas leaving the processing chamber is also exposed to high temperatures associated with the exhaust gas entering the converter. Electrical charges and magnetic effects may also be involved in the cracking or breakdown of components of the fuel.

Throughout the specification and claims, unless the context requires otherwise, the word "comprise" or variations such as "comprises" or "comprising" will be understood to imply the inclusion of a stated integer or group of integers but not the exclusion of any other integer or group of integers.

Furthermore, the following terms will be understood to have the following meanings:

"Combustion engine" will be understood broadly to encompass a heat engine wherein the combustion of a fuel occurs with an oxidizer in a combustion chamber.

"Combustion chamber" will be understood broadly to refer to a zone within a heat engine wherein combustion of the fuel takes place during operation. Insofar as internal combustion engines are concerned, the term may be understood to include reference to an operatively enclosed combustion chamber. Insofar as external combustion engines (such as Stirling engines) and reaction engines (such as jet engines, ramjet engines and rocket engines) are concerned, the term need not require that the combustion zone be fully enclosed.

"Cracking" will be understood broadly to refer to a process whereby precursor hydrocarbons are broken down into simpler molecules such as, but not limited to, lighter hydrocarbons by the breaking of carbon-carbon bonds in the precursors.

"Engine apparatus" will be understood broadly to encompass not only a single discrete engine but also, in different embodiments, a distributed arrangement of a plurality of discrete engines. Although exhaust gas from an engine will typically be recirculated back to the same engine after conversion, embodiments of the engine apparatus having multiple engines may be arranged so that the flow of exhaust gas from a first engine may be recirculated, via the disclosed converter, to a second or further engine. Further, it will be appreciated that the presently disclosed converter and process may be applicable to fuel conversion for a variety of different types of engines, including but not limited to internal combustion engines (ICE), external combustion engines (ECE) such as Stirling engines, and reaction engines such as jet engines and similar gas-turbine engines, turboprop engines, ramjet engines and rocket engines. Within the category of internal combustion engines, the system and process may find application in reciprocating piston engines or rotary engines. The internal combustion engines may be of the spark-ignition type (petrol engine) or the compression-ignition type (diesel engine).

Schauberger formations will be understood to mean turbulence-inducing formations and vortex-inducing structures, grooves, channels and other topography identified by Viktor Schauberger as being adapted to intensify either or both vortex energy and implosion energy. Without limitation thereto, such formations may be either disclosed in, or derivable from, AT 145,141 and one or more of the following patent publications: AT 117,749; AT 134,543; AT 126,637; AT 196,680; DE 202006000736U1; FR 1,057,576; GB 28,543; PT 29,729; and U.S. Pat. No. 1,655,197.

REFERENCES

[1] L. J. Pettersson and K. Sjöström (1990). *An experimental and theoretical evaluation of the onboard decomposed methanol spark-ignition engine*. Combust. Sci. and Tech. 71 (1990) 129-143.

[2] Green Car Congress. *Hydrogen-Enhanced Combustion Engine Could Improve Gasoline Fuel Economy by 20% to 30%*. https://www.greencarcongress.com/2005/11/hydrogenenhance.html/. Concept Engines, Fuel Efficiency, Fuels, Hydrogen (5 Nov. 2005).

[3] J. Cross, G. Jones, M. A. Kent. *An introduction to pre-reforming catalysis*. Nitrogen+Syngas 341 (2016) 40-48.

[4] L. Devi, K. J. Ptasinski and F. J. J. G. Janssen. *Decomposition of naphthalene as a biomass tar over pretreated olivine: Effect of gas composition, kinetic approach, and reaction scheme*. Ind. Eng. Chem. Res. 44 (2005) 9096-9104.

[5] H. Aldén, E. Björkman, M. Carlsson, L. Waldheim, in A. W. Bridgwater (Ed.). *Advances in Thermochemical Biomass Conversion*. Springer, Dordrecht (1993) 216-232.

The invention claimed is:

1. A fuel treatment system for cracking hydrocarbons contained within a fuel for a combustion engine having at least one target combustion chamber; said fuel being selected from the group consisting of petrol, diesel, and fuel oil; said fuel treatment system comprising:

a ducting arrangement which includes:

a primary ducting component for ducting exhaust gas from an exhaust gas generation means and venting it to atmosphere, said primary ducting component including an exhaust gas inlet zone configured to receive the exhaust gas from the exhaust gas generation means, and an exhaust gas outlet vent;

a secondary ducting component in fluid communication with the primary ducting component, and with the target combustion chamber of the combustion engine, said secondary ducting component comprising:
an exhaust gas offtake connected to the primary ducting component, for diverting a portion of the exhaust gas from the primary ducting component to serve as a carrier gas for the fuel;
a fuel enrichment component connected to the exhaust gas offtake, for enriching the diverted carrier gas with fuel, thereby to provide a fuel-enriched carrier gas;
a processing chamber connected to the fuel enrichment component and having an inlet zone for receiving the fuel-enriched carrier gas from the fuel enrichment component, and an outlet zone connectable to the target combustion chamber; said processing chamber being configured to alter at least one characteristic of the fuel-enriched carrier gas selected from the group consisting of its chemical and physical characteristics;
turbulence-inducing formations provided in the secondary ducting component, for inducing turbulence in the fuel-enriched carrier gas, wherein at least one of the turbulence-inducing formations comprises at least one spiral formation as a vortex-inducing structure; and
at least one elongate rod fixed in the processing chamber;
wherein said exhaust gas inlet zone of the primary ducting component and said outlet zone of the processing chamber are configured in a heat exchange relationship with each other and in a substantially counter-current gas flow direction with respect to each other, such that heat from exhaust gas operatively flowing in a first direction in said exhaust gas inlet zone is operatively transferred to the fuel-enriched carrier gas flowing in the substantially counter-current direction in the outlet zone of the processing chamber, thereby to provide that heat from hottest volumes of the exhaust gas operatively flowing in a furthest upstream portion of the ducting arrangement is transferred to fuel-enriched carrier gas operatively flowing in a furthest downstream portion of the processing chamber.

2. The fuel treatment system as claimed in claim 1, wherein spacings between adjacent coils of the spiral formation vary relatively to one another along a longitudinal axis of the spiral formation.

3. The fuel treatment system as claimed in claim 2, wherein the variable spacings between the adjacent coils of the spiral formation are configured in accordance with the Fibonacci sequence, such that a ratio of the axial length of a longer first coil to the axial length of a second shorter coil adjacent to the longer first coil, ranges from about 1.60 to about 1.64.

4. A fuel treatment system for cracking hydrocarbons contained within a fuel for a combustion engine having at least one target combustion chamber; said fuel being selected from the group consisting of petrol, diesel, and fuel oil; said fuel treatment system comprising:
a ducting arrangement which includes:
a primary ducting component for ducting exhaust gas from an exhaust gas generation means and venting it to atmosphere, said primary ducting component including an exhaust gas inlet zone configured to receive the exhaust gas from the exhaust gas generation means, and an exhaust gas outlet vent;
a secondary ducting component in fluid communication with the primary ducting component, and with the target combustion chamber of the combustion engine, said secondary ducting component comprising:
an exhaust gas offtake connected to the primary ducting component, for diverting a portion of the exhaust gas from the primary ducting component to serve as a carrier gas for the fuel;
a fuel enrichment component connected to the exhaust gas offtake, for enriching the diverted carrier gas with fuel, thereby to provide a fuel-enriched carrier gas; and
a processing chamber connected to the fuel enrichment component and having an inlet zone for receiving the fuel-enriched carrier gas from the fuel enrichment component, and an outlet zone connectable to the target combustion chamber; said processing chamber being configured to alter at least one characteristic of the fuel-enriched carrier gas selected from the group consisting of its chemical and physical characteristics;
wherein said exhaust gas inlet zone of the primary ducting component and said outlet zone of the processing chamber are configured in a heat exchange relationship with each other and in a substantially counter-current gas flow direction with respect to each other, such that heat from exhaust gas operatively flowing in a first direction in said exhaust gas inlet zone is operatively transferred to the fuel-enriched carrier gas flowing in the substantially counter-current direction in the outlet zone of the processing chamber, thereby to provide that heat from hottest volumes of the exhaust gas operatively flowing in a furthest upstream portion of the ducting arrangement is transferred to fuel-enriched carrier gas operatively flowing in a furthest downstream portion of the processing chamber; and
wherein the primary ducting component includes a plenum that shares a common wall with the processing chamber, and at least one spiral formation spirals around said common wall, with spacings between successive coils of the spiral formation increasing progressively in a direction of flow of the exhaust gas operatively flowing in the plenum.

5. A fuel treatment system for cracking hydrocarbons contained within a fuel for a combustion engine having at least one target combustion chamber; said fuel being selected from the group consisting of petrol, diesel, and fuel oil; said fuel treatment system comprising:
a ducting arrangement which includes:
a primary ducting component for ducting exhaust gas from an exhaust gas generation means and venting it to atmosphere, said primary ducting component including an exhaust gas inlet zone configured to receive the exhaust gas from the exhaust gas generation means, and an exhaust gas outlet vent;
a secondary ducting component in fluid communication with the primary ducting component, and with the target combustion chamber of the combustion engine, said secondary ducting component comprising:
an exhaust gas offtake connected to the primary ducting component, for diverting a portion of the exhaust gas from the primary ducting component to serve as a carrier gas for the fuel;
a fuel enrichment component connected to the exhaust gas offtake, for enriching the diverted carrier gas with fuel, thereby to provide a fuel-enriched carrier gas;
a processing chamber connected to the fuel enrichment component and having an inlet zone for receiving the fuel-enriched carrier gas from the fuel enrichment component, and an outlet zone connectable to the target combustion chamber; said processing chamber being configured to alter at least one characteristic of the fuel-enriched carrier gas selected from the group consisting of its chemical and physical characteristics;

turbulence-inducing formations provided in the secondary ducting component, for inducing turbulence in the fuel-enriched carrier gas; and at least one elongate rod fixed in the processing chamber, wherein at least one spiral formation spirals around the rod, with spacings between successive coils of the spiral formation increasing progressively in the direction of flow of a fuel-enriched gas operatively flowing in the processing chamber;

wherein said exhaust gas inlet zone of the primary ducting component and said outlet zone of the processing chamber are configured in a heat exchange relationship with each other and in a substantially counter-current gas flow direction with respect to each other, such that heat from exhaust gas operatively flowing in a first direction in said exhaust gas inlet zone is operatively transferred to the fuel-enriched carrier gas flowing in the substantially counter-current direction in the outlet zone of the processing chamber, thereby to provide that heat from hottest volumes of the exhaust gas operatively flowing in a furthest upstream portion of the ducting arrangement is transferred to fuel-enriched carrier gas operatively flowing in a furthest downstream portion of the processing chamber; and wherein at least one of the turbulence-inducing formations is selected from the group consisting of: vortex-inducing formations, vortex-creating formations, Schauberger formations, swirl-inducing formations, flow obstruction formations, flow deflection formations, flow redirection formations, laminar flow disrupting formations, matrices, jagged outcroppings projecting from interior surfaces of the processing chamber, rods, elongate flat dividers defining straight channels, grids, rings, turbulators, labyrinthine formations, knurled formations, topological formations, surface treatments, and surface deposition formations.

6. The fuel treatment system as claimed in claim 1, wherein the fuel enrichment component of the secondary ducting component is configured in a heat exchange relationship with a portion of the primary ducting component; and wherein the fuel enrichment component and said portion of the primary ducting component are arranged such that flow of the carrier gas through the fuel enrichment component and flow of the exhaust gas through said portion of the primary ducting component, respectively, are operatively substantially co-directional with respect to each other.

7. A fuel treatment system for cracking hydrocarbons contained within a fuel for a combustion engine having at least one target combustion chamber; said fuel being selected from the group consisting of petrol, diesel, and fuel oil; said fuel treatment system comprising:

a ducting arrangement which includes:

a primary ducting component for ducting exhaust gas from an exhaust gas generation means and venting it to atmosphere, said primary ducting component including an exhaust gas inlet zone configured to receive the exhaust gas from the exhaust gas generation means, and an exhaust gas outlet vent;

a secondary ducting component in fluid communication with the primary ducting component, and with the target combustion chamber of the combustion engine, said secondary ducting component comprising:

an exhaust gas offtake connected to the primary ducting component, for diverting a portion of the exhaust gas from the primary ducting component to serve as a carrier gas for the fuel;

a fuel enrichment component connected to the exhaust gas offtake, for enriching the diverted carrier gas with fuel, thereby to provide a fuel-enriched carrier gas;

a processing chamber connected to the fuel enrichment component and having an inlet zone for receiving the fuel-enriched carrier gas from the fuel enrichment component, and an outlet zone connectable to the target combustion chamber; said processing chamber being configured to alter at least one characteristic of the fuel-enriched carrier gas selected from the group consisting of its chemical and physical characteristics;

a fuel pretreater comprising a body defining a cavity for receiving fuel, the cavity being in fluid communication with a fuelling device of the fuel enrichment component; and a drivable vibrational element positioned and configured to vibrate fuel flowing through the body cavity;

wherein said exhaust gas inlet zone of the primary ducting component and said outlet zone of the processing chamber are configured in a heat exchange relationship with each other and in a substantially counter-current gas flow direction with respect to each other, such that heat from exhaust gas operatively flowing in a first direction in said exhaust gas inlet zone is operatively transferred to the fuel-enriched carrier gas flowing in the substantially counter-current direction in the outlet zone of the processing chamber, thereby to provide that heat from hottest volumes of the exhaust gas operatively flowing in a furthest upstream portion of the ducting arrangement is transferred to fuel-enriched carrier gas operatively flowing in a furthest downstream portion of the processing chamber.

8. The fuel treatment system as claimed in claim 1, in which the fuel enrichment component is positioned remotely from the exhaust gas generation means, and proximate the inlet zone of the processing component, such that a flow path to be traversed by the fuel-enriched gas flowing from the fuel enrichment component to the processing chamber, is kept as short as is practically feasible thereby to limit heat loss from the fuel.

9. The fuel treatment system as claimed in claim 1, wherein components of the system configured to carry fuel-enriched carrier gas are thermally insulated.

10. A fuel treatment system for cracking hydrocarbons contained within a fuel for a combustion engine having at least one target combustion chamber; said fuel being selected from the group consisting of petrol, diesel, and fuel oil; said fuel treatment system comprising:

a ducting arrangement which includes:

a primary ducting component for ducting exhaust gas from an exhaust gas generation means and venting it to atmosphere, said primary ducting component including an exhaust gas inlet zone configured to receive the exhaust gas from the exhaust gas generation means, and an exhaust gas outlet vent;

a secondary ducting component in fluid communication with the primary ducting component, and with the target combustion chamber of the combustion engine, said secondary ducting component comprising:

an exhaust gas offtake connected to the primary ducting component, for diverting a portion of the exhaust gas from the primary ducting component to serve as a carrier gas for the fuel;

a fuel enrichment component connected to the exhaust gas offtake, for enriching the diverted carrier gas with fuel, thereby to provide a fuel-enriched carrier gas;

a processing chamber connected to the fuel enrichment component and having an inlet zone for receiving the fuel-enriched carrier gas from the fuel enrichment component, and an outlet zone connectable to the target combustion chamber; said processing chamber being configured to alter at least one characteristic of the fuel-enriched carrier gas selected from the group consisting of its chemical and physical characteristics;

turbulence-inducing formations provided in the secondary ducting component, for inducing turbulence in the fuel-enriched carrier gas; and at least one elongate rod fixed in the processing chamber, wherein the rod is configured to be electrically charged;

wherein said exhaust gas inlet zone of the primary ducting component and said outlet zone of the processing chamber are configured in a heat exchange relationship with each other and in a substantially counter-current gas flow direction with respect to each other, such that heat from exhaust gas operatively flowing in a first direction in said exhaust gas inlet zone is operatively transferred to the fuel-enriched carrier gas flowing in the substantially counter-current direction in the outlet zone of the processing chamber, thereby to provide that heat from hottest volumes of the exhaust gas operatively flowing in a furthest upstream portion of the ducting arrangement is transferred to fuel-enriched carrier gas operatively flowing in a furthest downstream portion of the processing chamber; and wherein at least one of the turbulence-inducing formations is selected from the group consisting of: vortex-inducing formations, vortex-creating formations, Schauberger formations, swirl-inducing formations, flow obstruction formations, flow deflection formations, flow redirection formations, laminar flow disrupting formations, matrices, jagged outcroppings projecting from interior surfaces of the processing chamber, rods, elongate flat dividers defining straight channels, grids, rings, turbulators, labyrinthine formations, knurled formations, topological formations, surface treatments, and surface deposition formations.

11. The fuel treatment system as claimed in claim 1, wherein the rod occupies no more than about 10% of the interior volume of the processing chamber.

12. The fuel treatment system as claimed in claim 1, wherein the processing component includes a catalyst adapted for increasing the rate of a hydrocarbon cracking reaction.

13. A fuel treatment system for cracking hydrocarbons contained within a fuel for a combustion engine having at least one target combustion chamber; said fuel being selected from the group consisting of petrol, diesel, and fuel oil; said fuel treatment system comprising:

a ducting arrangement which includes:

a primary ducting component for ducting exhaust gas from an exhaust gas generation means and venting it to atmosphere, said primary ducting component including an exhaust gas inlet zone configured to receive the exhaust gas from the exhaust gas generation means, and an exhaust gas outlet vent;

a secondary ducting component in fluid communication with the primary ducting component, and with the target combustion chamber of the combustion engine, said secondary ducting component comprising:

an exhaust gas offtake connected to the primary ducting component, for diverting a portion of the exhaust gas from the primary ducting component to serve as a carrier gas for the fuel;

a fuel enrichment component connected to the exhaust gas offtake, for enriching the diverted carrier gas with fuel, thereby to provide a fuel-enriched carrier gas; and a processing chamber connected to the fuel enrichment component and having an inlet zone for receiving the fuel-enriched carrier gas from the fuel enrichment component, and an outlet zone connectable to the target combustion chamber; said processing chamber being configured to alter at least one characteristic of the fuel-enriched carrier gas selected from the group consisting of its chemical and physical characteristics;

wherein said exhaust gas inlet zone of the primary ducting component and said outlet zone of the processing chamber are configured in a heat exchange relationship with each other and in a substantially counter-current gas flow direction with respect to each other, such that heat from exhaust gas operatively flowing in a first direction in said exhaust gas inlet zone is operatively transferred to the fuel-enriched carrier gas flowing in the substantially counter-current direction in the outlet zone of the processing chamber, thereby to provide that heat from hottest volumes of the exhaust gas operatively flowing in a furthest upstream portion of the ducting arrangement is transferred to fuel-enriched carrier gas operatively flowing in a furthest downstream portion of the processing chamber; and wherein the fuel enrichment component is configured to impinge pressurized fuel onto a heated surface of the primary ducting component at pressures in excess of 2 Bar and temperatures above 450° C.

14. An engine apparatus which includes a fuel treatment system as claimed in claim 1, and at least one internal combustion engine having at least one target combustion chamber; wherein the processed fuel outlet zone of the secondary ducting component is connected to the target combustion chamber of the combustion engine.

15. The engine apparatus as claimed in claim 14, wherein the target combustion chamber is configured to receive fuel only from the fuel treatment system.

16. A method of retrofitting a fuel treatment system, as claimed in claim 1, to a combustion engine having at least one target combustion chamber, the method including connecting the ducting arrangement of the system to the combustion engine in fluid communication with the target combustion chamber.

17. A method of retrofitting a fuel treatment system to a combustion engine having at least one target combustion chamber, the fuel treatment system comprising:

a fuel treatment system for cracking hydrocarbons contained within a fuel for a combustion engine having at least one target combustion chamber; said fuel being selected from the group consisting of petrol, diesel, and fuel oil; said fuel treatment system comprising:

a ducting arrangement which includes:

a primary ducting component for ducting exhaust gas from an exhaust gas generation means and venting it to atmosphere, said primary ducting component including an exhaust gas inlet zone configured to receive the exhaust gas from the exhaust gas generation means, and an exhaust gas outlet vent;

a secondary ducting component in fluid communication with the primary ducting component, and with the target combustion chamber of the combustion engine, said secondary ducting component comprising:

an exhaust gas offtake connected to the primary ducting component, for diverting a portion of the exhaust gas from the primary ducting component to serve as a carrier gas for the fuel;

a fuel enrichment component connected to the exhaust gas offtake, for enriching the diverted carrier gas with fuel, thereby to provide a fuel-enriched carrier gas; and a processing chamber connected to the fuel enrichment component and having an inlet zone for receiving the fuel-enriched carrier gas from the fuel enrichment component, and an outlet zone connectable to the target combustion chamber; said processing chamber being configured to alter at least one characteristic of the fuel-enriched carrier gas selected from the group consisting of its chemical and physical characteristics;

wherein said exhaust gas inlet zone of the primary ducting component and said outlet zone of the processing chamber are configured in a heat exchange relationship with each other and in a substantially counter-current gas flow direction with respect to each other, such that heat from exhaust gas operatively flowing in a first direction in said exhaust gas inlet zone is operatively transferred to the fuel-enriched carrier gas flowing in the substantially counter-current direction in the outlet zone of the processing chamber, thereby to provide that heat from hottest volumes of the exhaust gas operatively flowing in a furthest upstream portion of the ducting arrangement is transferred to fuel-enriched carrier gas operatively flowing in a furthest downstream portion of the processing chamber; and the method comprising:

connecting the ducting arrangement of the system to the combustion engine in fluid communication with the target combustion chamber; and removing all fuel supply to the target combustion chamber apart from a supply of fuel-enriched carrier gas from the fuel treatment system, so that all fuel operatively combusted by the combustion engine is received into the target combustion chamber only from the processing chamber of said fuel treatment system.

18. The fuel treatment system as claimed in claim 10, in which the fuel enrichment component is positioned remotely from the exhaust gas generation means, and proximate the inlet zone of the processing component, such that a flow path to be traversed by the fuel-enriched gas flowing from the fuel enrichment component to the processing chamber, is kept as short as is practically feasible thereby to limit heat loss from the fuel.

19. The fuel treatment system as claimed in claim 10, wherein the rod occupies no more than about 10% of the interior volume of the processing chamber.

20. The fuel treatment system as claimed in claim 10, wherein the processing component includes a catalyst adapted for increasing the rate of a hydrocarbon cracking reaction.

* * * * *